United States Patent [19]

Yamada et al.

[11] Patent Number: 4,916,048

[45] Date of Patent: Apr. 10, 1990

[54] OPTICAL RECORDING MEDIUM AND METHOD OF OPTICAL RECORDING AND ERASING USING MEDIUM

[76] Inventors: Noboru Yamada, 4-2, 1-chome, Kuzuhaoka, Hirakata-shi, Osaka-fu 573; Kenichi Nishiuchi, 4-49, Satanaka-machi, Moriguchi-shi, Osaka-fu 570; Mutsuo Takenaga, 12-305 Ikuno, Katano-shi, Osaka-fu 576, all of Japan

[21] Appl. No.: 930,017

[22] Filed: Nov. 7, 1986

Related U.S. Application Data

[63] Continuation of Ser. No. 594,561, Mar. 29, 1984, abandoned.

[30] Foreign Application Priority Data

Apr. 1, 1983 [JP] Japan ................... 58-58158

[51] Int. Cl.$^4$ ............................ G03C 1/72; G03C 1/94
[52] U.S. Cl. ................................. 430/523; 430/524; 430/531; 430/495; 430/945; 430/19; 430/21; 346/135.1; 346/76 L
[58] Field of Search ............... 430/495, 945, 531, 523, 430/524, 270, 19, 21; 346/135.1, 76 L; 365/106, 127

[56] References Cited

U.S. PATENT DOCUMENTS

| | | | |
|---|---|---|---|
| 3,636,526 | 1/1972 | Feinleib | 346/135.1 |
| 3,971,874 | 7/1976 | Ohta et al. | 430/495 |
| 3,983,542 | 9/1972 | Ovshinsky | 430/346 |
| 4,188,214 | 2/1980 | Kido et al. | 430/495 |
| 4,278,734 | 7/1981 | Ohta et al. | 430/495 |
| 4,473,633 | 9/1984 | Wada et al. | 430/495 |
| 4,587,209 | 5/1986 | Ohno et al. | 430/945 |
| 4,636,806 | 1/1987 | Watarai et al. | 430/945 |
| 4,637,976 | 1/1987 | Terao et al. | 430/945 |

FOREIGN PATENT DOCUMENTS

| | | |
|---|---|---|
| 2933253 | 3/1980 | Fed. Rep. of Germany . |
| 2242744 | 3/1975 | France . |
| 58-54338 | 3/1983 | Japan . |
| 2034957 | 6/1980 | United Kingdom . |

OTHER PUBLICATIONS

Maydan, D., "Micromachining and Image Recording on Thin Films by Laser Beams", Bell System Technical Journal, vol. 50, No. 6, pp. 1761-1780, Jul.-Aug. 1971.

*Primary Examiner*—Won H. Louie

[57] ABSTRACT

The invention is directed to an optical recording member including a thin film photosensitive layer provided on a base. The thin film photosensitive layer may vary between a low optical density state and a high optical density state when optical energy is applied thereto. This thin film photosensitive layer contains a first element which may be a metal or semimetal, a second element which is at least one selected from Te, Ge, Sn, Al, Ti, V, Cr, Mn, Fe, Co, Ni, Cu, Zn, Ga, Mo, Rh, Pd, Ag, Cd, In, Ta, W, Pt, Au, Tl, Pb, Si, Sb, Bi, and an oxygen element. Part of the oxygen element is bonded with the first element to form its oxide. The ratio x of the total number of atoms of the oxygen element to that of the first element, when the maximum valence of the first element in a stable oxide state is n, is according to the relation of $0 < x < n/2$. At least part of the second element exists in a non-oxide state. This thin film photosensitive layer is formed by a vacuum deposition or sputtering method. By irradiating the optical recording medium with light, information may be recorded or recorded information may be erased.

16 Claims, 12 Drawing Sheets

OPTICAL RECORDING MEDIUM AND METHOD OF OPTICAL RECORDING AND ERASING USING MEDIUM

This is a continuation of Ser. No. 594,561, filed 3/29/84, now abandoned.

BACKGROUND OF THE INVENTION

This invention relates to an erasable optical recording medium capable of erasing previously recorded information or recording new information while erasing previously recorded information, and a method of optical recording and erasing using the same medium, and more particularly to an optical recording medium capable of sufficiently recording information and erasing the recorded information with a light source of small energy and a method of optical recording and erasing using the same medium.

The quantity of information to be recorded and reproduced has been tremendously increasing in recent years, and there is a keen demand for an innovative method capable of recording and reproducing at higher speed and higher density as compared with conventional information recording and reproducing methods. In this regard, current attention has been directed to various methods of recording and reproducing the information optically. Typical examples of hitherto proposed methods in this field are as follows.

As a first example, a recording method reported by D. Maydan, "The Bell System Technical Journal," Vol. 50, No. 6 (1971), pp. 1761-1788, involves the use of a thin film (about 0.1 $\mu$m) of a low melting point metal such as In or Bi formed on a glass or plastic substrate. When a laser beam is applied to the metal thin film in very tiny spots (about 10 $\mu$m or smaller in diameter), tiny cavities are formed in the illuminated spots through the absorption of light, the rise in temperature and resultant fusion, and displacement and/or evaporation of the metal. Thus, the illuminated spots become transparent or translucent, so that an optically reproducible and permanent image is formed.

As a second example, U.S. Pat. No. 3,636,526 proposes the use of an amorphous semiconductive material, more specifically a calcogenide not containing oxygen, as typified by $Ge_{15}Te_{81}Sb_2S_2$, $As_2S_3$ and $As_{20}Se_{60}Ge_{20}$. When light such as a laser beam is applied to a thin film of such material, there occurs a change in the bonding state of the atoms of the material as a result of a temperature increase by absorption of light, so that the thin film exhibits a change in the optical density in the illuminated area. By this change in optical density, the information is recorded.

As a third example, U.S. Pat. No. 3,983,542 discloses facilitating the transfer from a low optical density state (an amorphous state) to a high optical density state (a crystalline state) by adding halogen, iodine, bromine, oxygen, steam, alkaline metal element, sulfur, selenium, tellurium or others to a base recording material.

As a fourth example, U.S. Pat. No. 3,971,874 proposes a recording material having a thin film of which essential material is represented by $[TeO_x]$ were x is smaller than 2.0. When irradiated with light such as a laser beam, the thin film undergoes a change from a low optical density state to a high optical density state as a result of a temperature increase by absorption of light energy. By this change in state, the information is recorded.

As a fifth example, U.S. Pat. No. 4,278,734 proposes the inclusion of S and/or Se by up to 50 mol % in a thin film made of a material represented by $[TeO_x]$, where x is smaller than 2.0 or $[BiO_x]$, where x is smaller than 1.5. When this thin film is irradiated with light, the optical density of the film changes, and the information is recorded. The recorded information may be erased by irradiating with light of a sufficient energy density.

OBJECTS AND SUMMARY OF THE INVENTION

The present invention, therefore, has as its principal object the provision of an optical recording medium having a photosensitive layer capable of recording information, and of erasing the recorded information and recording other information, repeatedly and satisfactorily.

It is another object of the invention to provide an optical recording medium capable of recording and erasing repeatedly and satisfactorily with an excellent resistance to humidity, not deteriorating in a short time if left exposed in the atmosphere.

It is a further object of the invention to provide an optical recording medium in which a high optical density state and a low optical density state are respectively retained in a stable state.

It is still another object of the invention to present an optical recording medium which may be manufactured easily by a vacuum deposition or sputtering method.

It is a still further object of the invention to provide a method of recording information optically by using the optical recording medium of this invention.

It is one of the other objects of the invention to provide a method of recording and erasing information optically, using the optical recording medium of this invention, wherein the recording of information and the erasing of the recorded information may be effected easily with a light source of low energy.

These and other objects are accomplished by an optical recording medium having a photosensitive layer including a first element selected from a metal or semimetal group, a second element of at least one selected from the group of Te, Ge, Sn, Al, Ti, V, Cr, Mn, Fe, Co, Ni, Cu, Zn, Ga, Mo, Rh, Pd, Ag, Cd, In, Ta, W, Pt, Au, Tl, Pb, Si, Sb and Bi, the second element being different from the first element, and an oxygen element, where in at least part of the oxygen element is bonded with said first element to form its oxide, and the ratio x of the total of number of atoms of said oxygen element to that of said first element is, assuming the maximum valence of the first element in a state where the first element is stable to be n, in a relation of $0 < x < n/2$, and at least part of said second element exists in a non-oxide state. The optical density of the optical recording medium varies when a light energy is applied In the various embodiments, said first element is one selected from the group of Te, Sb, Bi, Si, Ge, Sn, Pb, In, Tl, Mo and W. The content z of the second element is set within $0 < z \leq 50$ mol %. In particular, in order to vary the optical density with a small light energy, this content z is set somewhere between 10 and 30 mol %. When the second element is Te, its content z may be set somewhere between 10 and 70 mol %. When the first element is Te and the second elements are Sn and Ge, the contents $z_1$ and $z_2$ of Sn and Ge are set respectively within 10 mol % $< z_1 \leq 30$ mol % and $0 < z_2 \leq 10$ mol %. In this case, the value of x should be set within $0.1 \leq x \leq 1.5$, or more preferably $0.2 \leq x \leq 1.2$. Said photosensitive layer is formed by a vacuum deposition or sputtering method.

This invention also relates to a method of recording and erasing information using the same optical recording medium. In its various embodiments, the light irradiating conditions when applying a light energy to the photosensitive layer are determined to satisfy the following expressions:

$$\tau_2 \leq \tau_1, P_2 \geq P_1$$

where $P_1$ is the irradiation power density of light energy when varying the optical density of the photosensitive layer from a low state to high state (mW/$\mu$m$^2$), $\tau_1$ is its irradiation time (seconds), $P_2$ is the irradiation power density of light energy when varying the optical density of the photosensitive layer from a high state to a low state (mW/$\mu$m$^2$), and $\tau_2$ is its irradiation time (seconds).

In one embodiment, to satisfy said irradiation conditions, the laser beam is reduced to a circular spot when varying the optical density of the photosensitive layer from a high state to a low state, and the beam is widened to a slender elliptical form when changing the optical state of the layer from a low state to a high state. In another embodiment, the photosensitive layer is formed on a rotary disc, and the disc rotating speed is higher when changing from a high density to a low density than when changing from a low density to a high density.

This invention provides various advantages, among which are as follows.
(1) An optical recording medium capable of recording and erasing repeatedly and satisfactorily.
(2) An optical recording medium resistant to humidity and capable of recording and erasing repeatedly and satisfactorily without deteriorating in a short period if let stand in the atmosphere.
(3) An optical recording medium wherein both a high optical density state and a low optical density state are stable.
(4) An optical recording medium which may easily manufacturing by a vacuum deposition or sputtering method.
(5) A method of recording and erasing information easily with a light source of low energy.

While the novel features of the invention are set forth with particularly in the appended claims, the invention, both as to organization and content, will be better understood and appreciated, along with other objects and features thereof, from the following detailed description taken in conjunction with the drawings.

DETAILED DESCRIPTION OF THE DRAWINGS

Figure 1:
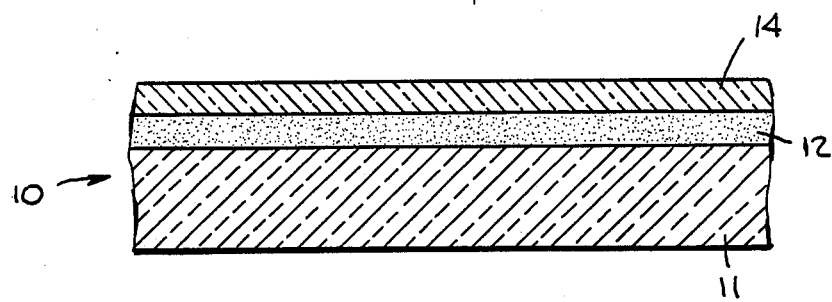
FIG. 1 is a sectional view of an optical recording medium according to one of the embodiments of the invention.

Referring now to FIG. 1, an optical recording medium is generally indicated by numeral 10, which is composed of a base 11, a thin film photosensitive layer 12, and a protective layer 14. Examples of usable materials for the base 11 include metal such as aluminum and copper, glass such as quartz, pyrex and soda glass, synthetic resin such as ABS resin, plystyrene, PMMA (polymethyl methacrylate) as one kind of acrylic resin, polyvinylchloride, and transparent film such as acetate, Teflon, polycarbonate and polyester. Among others, when polycarbonate film, polyester film or PMMA plate is used, the transparency is excellent and it is effective to optically produce the formed signal images.

The thin film photosensitive layer 12 is formed on the base 11 by a vacuum deposition or sputtering method. This photosensitive layer 12 comprises a first element selected from a group of metals or semimetals, a second element of at least one, which is different from the first element, selected from the group of Te, Ge, Sn, Al, Ti, V, Cr, Mn, Fe, Co, Ni, Cu, Zn, Ga, Mo, Rh, Pd, Ag, Cd, In, Ta, W, Pt, Au, Tl, Pb, Si, Sb, Bi, and an oxygen element, wherein at least part of the oxygen element is bonded with the first element to form its oxide, and the ratio x of the total number of atoms of the oxygen element to that of first element, assuming the maximum valence of the first element in a stable oxide state to be n, satisfies the relation of $0<x<n/2$. In addition, at least part of the second element exists in a non-oxide state. Examples of the first element may include Te, Sb, Bi, Si, Ge, Sn, Pb, In, Tl, Mo and W.

The protective layer 14 is formed on this thin film photosensitive layer 12 to protect the photosensitive layer. As this protective layer 14, the same material as the base 11 may be used, and this material may be adhered by using an ultraviolet curing resin or by vacuum deposition.

Examples of a composition include a first element M, selected from a metal or semimetal group and an oxygen element which is bonded with said first element M to form its oxide, wherein the ratio x of the total number of atoms of said oxygen element M to that of the element, is in a relation of $0<x<n/2$ when the maximum valence of the first element in a stable oxide state (not in an unstable peroxide state) is n. Hereinafter this composition is represented by $[MO_x]$. This oxide may include, among others, $[TeO_x](0<x<2)$, $[SbO_x](0<x<3/2)$, $[BiO_x](0x<3/2)$, $[SiO_x](0<x<2)$, $[GeO_x](0<x<2)$, $[SnO_x](0<x<2)$, $[PbO_x](0<x<2)$, $[InO_x](0<x<3/2)$, $[TlO_x](0<x<3/2)$, $[MoO_x]$ $(0<x<3)$, and $[WO_x](0<x<3)$. These compositions may be formed as a thin film layer on a substrate by a vacuum deposition process, and they typically present a pale brown color (a pale blue color in the case of $[MoO_x]$ and $[WO_x]$) when irradiated with a laser beam. (This phenomenon is called "darkening" or "blackening".) At the same time, it is known that their optical constants such as refractive index (n) and extinction coefficient (k) change significantly. Among these compositions, ones represented by $[TeO_x]$, $[SbO_x]$, $[BiO_x]$, $[GeO_x]$, $[SnO_x]$, $[InO_x]$, and particularly one represented by $[TeO_x]$, exhibit greater changes in said optical constants as well as greater sensitivity, and, when used as recording media, the present high recording sensitivity and S/N ratio.

The individual internal structures and functional mechanism of these compositions are not fully elucidated, but at least two models may be considered. The first model is a mixture of an oxide such as $TeO_2$, $GeO_2$, $Sb_2O_3$, $Sn_2O_3$ and a semimetal or metal such as Te, Ge, Sb or Sn, which are mixed in extremely small particles of about 20 Å. The second model is a composition not containing a semimetal or metal, e.g. a composition represented by $[InO_x]$ $(0<x<3/2)$ which is formed by complicated combinations of several oxides differing in the number of oxygens, such as $In_2O$, $InO$, and $In_2O_3$, or a composition represented by $[SiO_x](0<x<2)$ similarly formed by SiO and $SiO_2$.

Based on these models, the recording principle for the blackening transition of said composition may be assumed as follows.

In the case of compositions represented by $[TeO_x](0<x<2)$, $[SbO_x](0<x<1.5)$ and $[GeO_x](0<x<2)$, for example, when fine particles constituting these compositions are irradiated with light, a plurality of particles gather together and the particle size grows. The refractive index (n) and extinction coefficient (k) of the illuminated part are changed, which may be detected as the changes in the reflectivity and transmission of the thin film of the composition.

In the case of $[InO_x]$ $(0<x<3/2)$ both the first and second models are considered. As in the case of a composition represented by $TeO_x$ as above, fine particles of In may grow to vary in the particle size (first model), or the bonding state of atoms such as $In_2O$ and $InO$ constituting the composition represented by $InO_x$ may vary (second model), which results in changes in the optical constants such as refractive index (n) and extinction coefficient (k), as well as changes in the reflectivity and transmission of the thin film of the composition.

These changes are theoretically reversible, but it was conventionally relatively difficult to return the optical constants (n) and (k), changed to the darkened or blackened state, to the original values, that it, to return the reflectivity and transmission to the initial values. It appears that the particles of metal or semimetal in the composition, once increased in size, cannot be restored to the initial small particles. In general, in order to increase the size of fine particles, it is necessary to heat the substance to its melting point in a short time and then to slowly cool or to keep the temperature near the melting point for a long period. To reduce the size, in contrast, it is necessary to heat the substance once over the melting point to fuse the substance and then suddenly cool to freezing while the particles are small in size.

However, for instance, in the case of compositions represented by $[TeO_x]$, $[GeO_x]$ and similar compositions, the change in the optical characteristics depends mainly on the change in the fine particles of Te or Ge which constitute the composition, but since these fine particles are surrounded with oxides, $TeO_2$, and $GeO_2$, with low thermal conductivity, which means heat release is difficult, the heat energy is hard to diffuse, that is, the condition of rapid cooling is not satisfied. In addition, the substance Te or Ge alone has a property of increasing in particle size rapidly in the process of cooling, and it is difficult to obtain particles of small size unless cooled at a very high rate. If quick cooling is attempted by irradiating with light of a very short pulse width on the order of scores of nanoseconds, the particles are not primarily formed in a stable and small size. Therefore, if some fine particles are formed, they do not stably exist alone and the particle size grows in a short time, which appears not to be reversible. Yet, since the light absorption of compositions represented by $[TeO_x]$ and $[GeO_x]$ is relatively small, the efficiency of light absorption is poor and it is difficult to heat up to a temperature necessary for fusing, which is assumed to be one of the causes of the difficulty of returning the Te and Ge to small particles. In short, the heightening of the reversible function in the thin film of such compositions depends on how to return the once-grown particles in the composition to the initial small ones. The next important problem is how stable are the returned small particles, and another problem is how to repeatedly obtain this reversible change.

To solve these problems, it is intended to enhance the reversibility of the particle size of the thin film of the composition by adding a substance to satisfy at least one of the following conditions in the thin film.

(1) The light absorption factor of the thin film is increased, and the upper limit of the temperature of the illuminated part is raised.

(2) The increase of particle size is restricted by bonding with particles of Te, Ge, etc., and the melting point is lowered to more easily realize the fusion state. At the same time, the vapor pressure of the thin film is held down to prevent evaporation of the thin film.

(3) The stability of the fine particles is increased by being present among fine particles of Te, Ge, etc. when cooling quickly from the fusion state, whereby the growth of the particles is inhibited, and the stability of the fine particles is also increased by being bonded with Te, Ge, etc. after the cooling process.

(4) The absorbed heat is more easily dispersed, and quick cooling conditions are established by the particles being present around particles of Te, Ge, and the like.

As a result of experiments, it was found that the particle size can be changed reversibly when at least one of Te, Ge, Sn, Al, Ti, V, Cr, Mn, Fe, Co, Ni, Cu, Zn, Ga, Mo, Rh, Pd, Ag, Cd, In, Ta, W, Pt, Au, Tl, Pb, Si, Sb, and Bi, capable of satisfying at least one of the conditions stated above, is added to the thin film of said composition in a state where at least part of such substance is not an oxide. The substances of the above group, generally, have large light absorption, large thermal conductivity as a single element, and a distinct melting point and boiling point. When they are bonded with fine particles of metal or semimetal to form said composition, it is easier to control the melting point, boiling point and vapor pressure of said composition. Accordingly, they are considered to be useful for facilitating the reversible changes of the optical characteristics of the composition. In addition, these substances are easy to handle in a vacuum deposition or sputtering process, and it is easy to form a thin film.

However, as will be mentioned later the number, kind and quantity of the substances to be added and selected from the above group varies depending on the kind of a composition represented by $[MO_x]$ herein, and they may be determined experimentally. Generally, it has been found that metals such as Sn, In, Bi, Zn, Al, Pb, Tl or Cu and semimetals such as Te, Ge and Sb are effective, and in particular when one of Sn, In, Bi, Te or Sb was added, it very effectively enhanced the reversibility of the optical characteristic changes because evaporation or breakdown of the thin film did not occur when using the film repeatedly for recording and erasing. Since these substances, such as Sn, In, Bi, Te or Sb have a relatively low melting point, for example 231.9° C., 156.4° C., 271° C., 450° C. and 630.5° C., respectively, and a relatively high boiling point, for example 2270° C., 2100° C., 1560° C., 1390° C. and 1640° C., respectively, they seem to lower the melting point of the entire system by bonding with the metal or semimetal particles forming the composition and lower the vapor pressure at the same time to prevent evaporation when irradiated with a laser beam. In addition, particles of Te, Sb, etc. have a high absorption efficiency with respect to infrared rays, and seem to elevate the temperature well by absorbing the energy of the laser beam. Also, since these elements are relatively easily bonded with the metal or semimetal particles of the composition, it may be assumed that they contribute greatly to reduction of particle size by impeding the growth of the metal or semimetal particles of the composition and retarding the growth of particles in the cooling process. In other words, it may be assumed that since they are substances of relatively low melting point and high boiling point, they are bonded with fine particles of metal or semimetal existing in the composition to relatively lower their melting point, facilitate fusion, and also hold down the vapor pressure, thereby preventing the evaporation of the illuminated part when recording and erasing are repeated by irradiating with a laser beam. It is also possible to assume that they retard the rate of increase of particle size of the composition in a quick cooling process so as to freeze the particles while the size is small.

Incidentally, when Ge was added to the composition, the state of low optical density, after quick cooling of the thin film of the composition following irradiation with a laser beam, was very stable, and the effect was to considerably improve the storability of recorded signals. This seems to be because the tendency of fine particle to increase in size is drastically weakened when Ge particles are bonded with fine particles of metal or semimetal existing in the composition, thereby preventing the fine particles from growing in size if heated to some extent.

The addition of metal or semimetal elements, such as Zn, Sb, Tl, Bi, Sn, In, Pb, Cu, Al or Te to the composition seems to suitably enhance the stability of the recording or erasing state and to improve the reversibility.

Thus, by adding a plurality of metals or semi-metals, differing in effects, to the composition, the recording and erasing characteristics of the thin film of the composition may be freely adjusted. The thin film of the composition usually presents a pale brown color when freshly formed by vacuum deposition, and turns to a dark brown color (this phenomenon being called darkening or blackening) to vary in the optical density when provided with a light energy at a relatively weak power and a relatively long pulse width. When the darkened or blackened thin film is provided with a light energy at a relatively strong power and a relatively short pulse width, in contrast, the optical density is lowered (this phenomenon being called whitening). Reversible changes are thereby created.

The composition represented by $[MO_x]$, as will be further described later, exhibits large optical changes, high recording and erasing sensitivity, and good repeatability of recording and erasing. The compositions represented by $TeO_x$, $GeO_x$, $InO_x$, $BiO_x$, $SnO_x$, $TlO_x$, and $SbO_x$ were effective, the composition represented by $TeO_x$ being particularly effective among the others. The characteristics of these compositions vary depending on the value of x. Generally, the greater the value of x, the smaller becomes the change of optical density before and after recording, while the greater becomes the weatherability such as humidity resistance and heat resistance. When the value of x is smaller, the change of optical density becomes greater, but the weatherability becomes smaller. Accordingly, the practical region may be, for example, about $x=1.0$, in a composition represented by $TeO_x$. Nevertheless, when another metal or semimetal selected from the group listed earlier is added to the thin film of such compositions, if the value of x is smaller, the weatherability does not decrease, so that the region of a relatively large change of optical density may be realized.

For example, in a composition including $TeO_x$ and further containing Sn and Ge, wherein the content of Sn and Ge was respectively 15% and 5%, deterioration due to humidity was notably smaller even when the value of x was near 0.1, as compared with the performance of an oxygen-free composition. When the value of x was increased to about 1.5, on the other hand, it was observed that darkening or blackening was facilitated but that the power of the laser required for whitening was increased. This seems to be because when the $TeO_2$ in the film increases to lower the quick cooling effect, the absorption efficiency is lowered. Similarly, in other compositions, films particularly excelling in both stability and reversibility were obtained in the region of $0.1 \leq x \leq 1.5$, more preferably $0.2 \leq x \leq 1.3$ in the case of materials represented by $[GeO_x]$ and $[SnO_x]$, and in the region of $0.2 \leq x \leq 1.3$ in the case of materials represented by $[InO_x]$, $[BiO_x]$ and $[SbO_x]$.

Figure 2:
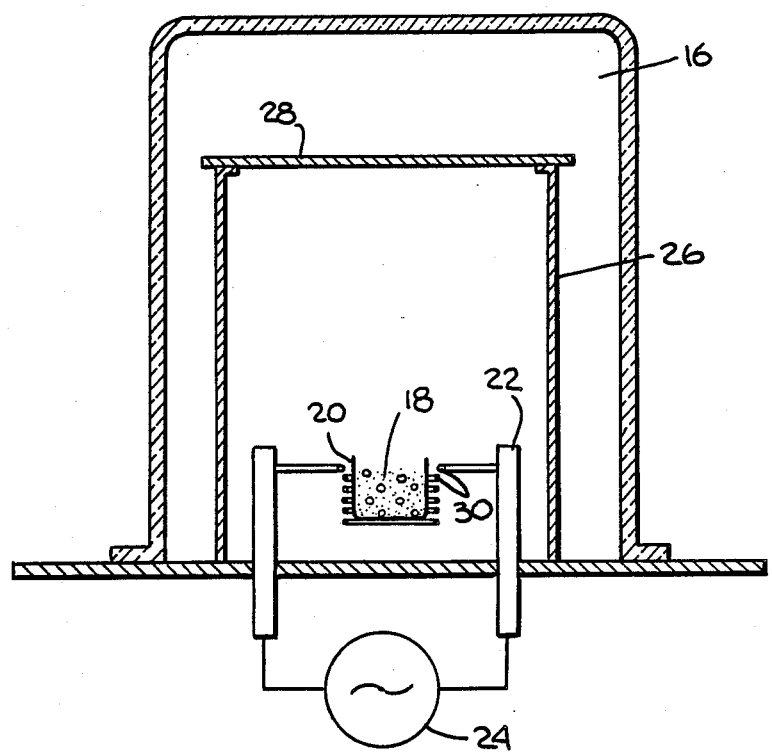
FIG. 2 is a schematic sectional view of a one-source type vacuum deposition equipment for manufacturing the optical recording medium.

The methods of forming said thin film photosensitive layer 12 by vacuum deposition using one vacuum deposition source will now be explained. FIG. 2 illustrates a vacuum deposition apparatus used for this purpose. The degree of vacuum in the vacuum apparatus 16 ranges between $10^{-3}$ Torr and $10^{-6}$ Torr.

For example, as one vacuum deposition source, that is, as a raw material 18 for vacuum deposition, an oxide $M_AO_2$ ($M_A$ is a first element, being a metal or semimetal of valence of 4) is put into a tungsten tantalum or other metallic boat, that is a container 20 for heating and vacuum deposition, and the boat 20 is coupled with electrodes 22 in the vacuum apparatus 16. When heated by using an alternating current power source 24, the raw material 18 in the container 20 reacts with the container 20 and undergoes a reduction reaction, and is evaporated on a base 29 disposed on a support table 26. The reaction proceeds, for example, according to the following equation: $M_AO_2 + mW \rightarrow [M_AO_x]\uparrow + mWO_3$ ($0 > x > 2$, $m > \frac{2}{3}$). A bonded material of the first element $M_A$ and the oxygen element O, at a ratio x of the total number of atoms (indicated by $[M_AO_x]$ in the chemical formula above where $0 < x < 2$), is obtained. Therefore, when a second element to be contained in the photosensitive layer is preliminarily mixed with the raw material of oxide ($M_AO_2$), vacuum deposition is performed in the form of $[(M_AO_2)_{100-x1}M_{Cx1}]$, wherein $M_C$ is a second element, x1 is the mol %, wherein $0 < x1 \leq 50$. A thin film photosensitive layer $[(M_AO_x)_{100-x2}M_{Cx2}]$, wherein x1, and x2 is the mol % and $0 \leq x \leq 2$, and $0 \leq x2 \leq 50$, and $M_C$ is a second element, is obtained.

When stable quartz, alumina ceramic, platinum, etc. is used for the container 20 for heating and vacuum deposition, the raw material may be further blended with a powder of a reducing agent R (Fe, Cr, W, etc.), and the container 20 may be heated by a coil heater 30. The heating temperature is selected within the range of 600° C. through 1,000° C.

Figure 3:
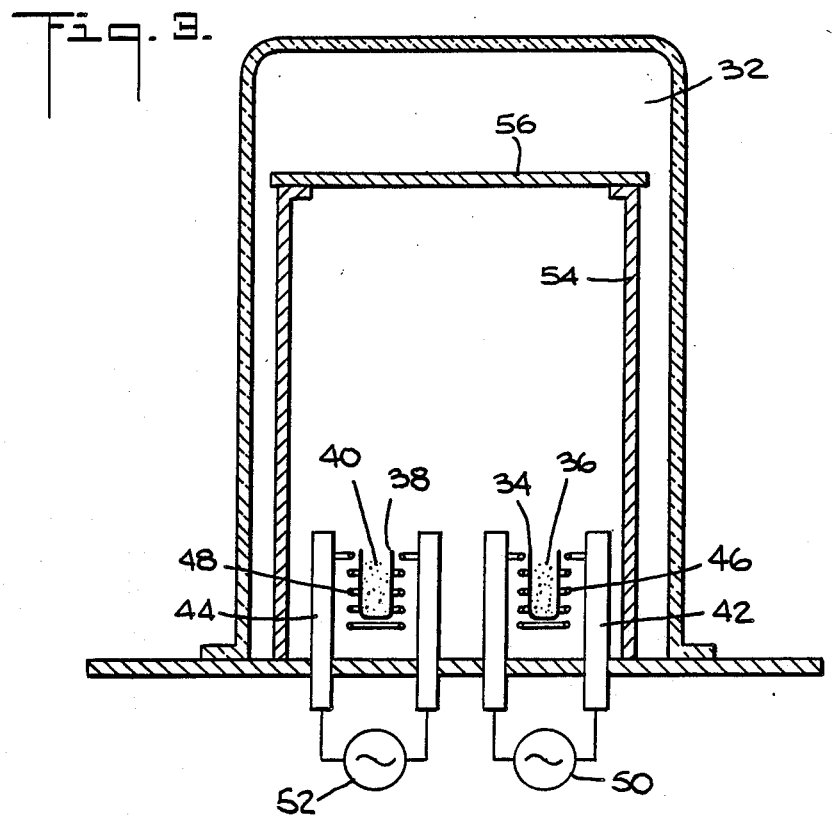
FIG. 3 is a schematic sectional view of a two-source type vacuum deposition equipment for manufacturing the optical recording medium.

Another method is to form a thin film photosensitive layer by vacuum deposition on the base by evaporating simultaneously from two sources. FIG. 3 shows a vacuum deposition apparatus used in this process. The degree of vacuum of a vacuum deposition apparatus 32 should be selected within the range of $10^{-3}$ through $10^{-6}$ Torr. An oxide $M_AO_2$ ($M_A$ is a first element) as one of the raw materials 36 for vacuum deposition and $[M_A {100-x1}M_{Cx1}](0 < x1 \leq 50$ mol %, $M_C$ being a second element) as one of the raw materials 40 for vacuum deposition, are placed in a container 34. The materials are heated by alternating current power sources 50, 52 by the use of coil heaters 46, 48 which are coupled to electrodes 42, 44 in the vacuum apparatus 32. By properly controlling the rate of evaporation of the two sources, a thin film photosensitive layer may be obtained on the evaporating plane of a base 56 according to the following equation:

$$M_AO_2 + m(M_{A100-x1})M_{Cx1} \rightarrow (M_AO_x)_{100-x2}M_{Cx2}$$

Further increasing the sources, it is also possible to evaporate and form simultaneously from three sources, for example, $M_AO_2$ as the first element oxide, $M_A$ as the first element, and $M_C$ as the second element As the heating method, instead of indirect heating by coil heater, it is also possible to heat directly by using electron beams. The film thickness of vacuum deposition when evaporating the photosensitive layer may be freely changed in relation to the quantity of raw materials for vacuum deposition, the relation between the substrate and evaporating source, and other factors.

Meanwhile, when the content (x2) of the second element which is contained in the thin film photosensitive layer exceeds 50 mol %, generally, a greater power for whitening is required of the light source, for example, the laser beam.

Figure 4:
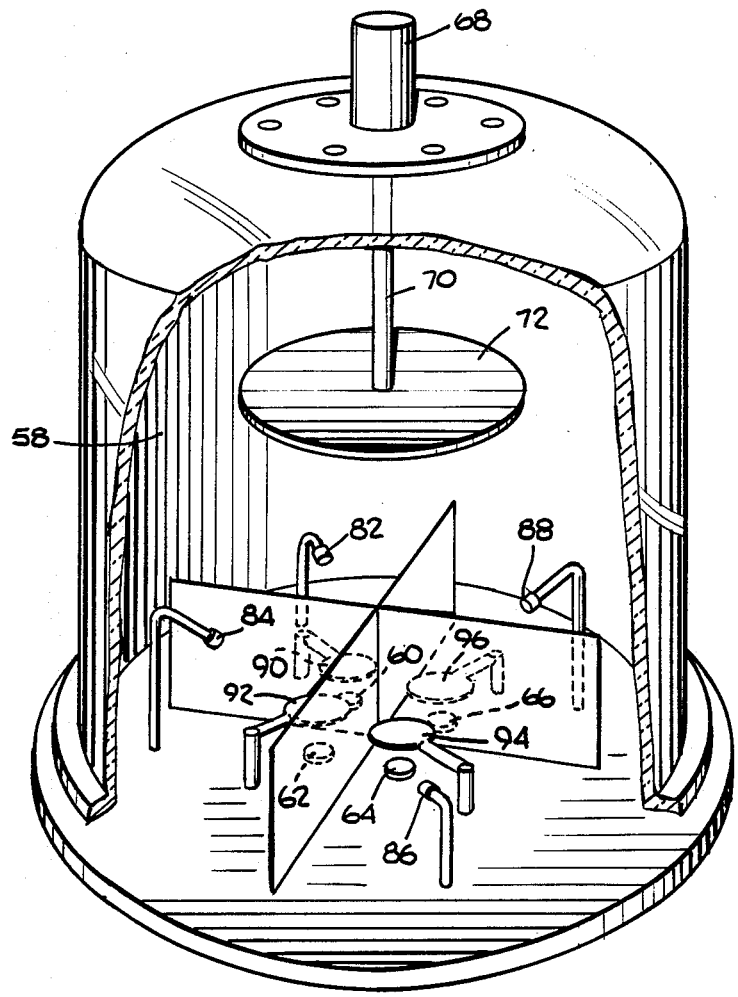
FIG. 4 is a schematic sectional view of a four-source type vacuum deposition equipment for manufacturing the optical recording medium.

There is also a method of forming a thin film photosensitive layer containing two second elements $M_C$ and $M_D$ by simultaneous evaporation on the base from four sources of vacuum deposition. FIG. 4 shows an apparatus for such a method. The degree of vacuum of a vacuum deposition aparatus should be selected within the range of $10^{-3}$ through $10^{-6}$ Torr. Vacuum deposition containers 60, 62, 64, 66 are arranged on a circumference so as to be equally distanced from a base (corresponding to the base 10 in FIG. 1) which is rotated by a shaft 70 connected to an external motor 68. As the raw materials for sources of vacuum deposition, an oxide of a first element ($M_AO_2$), a first element ($M_A$), and two second elements ($M_C$, $M_D$) are used. These sources may be heated either indirectly on the outer wall of the vacuum deposition containers by coil heaters connected to external power sources as shown in FIGS. 2 and 3, or directly be electron beams from an electron gun installed inside the vacuum apparatus. The evaporation rate from each source is individually monitored by crystal oscillators or similar film thickness monitors 82, 84, 86 and 88, and the output signals are fed back to said external power sources, so that the rate may be independently controlled by varying the temperature of the coil heater or the current of the electron beam.

In the vacuum deposition, by setting the rate of vacuum deposition from each source according to the design of the thin film composition, shutters 90, 92, 94 and 96 are opened when reaching the target value, and a thin film photosensitive layer containing additive substances $[M_AO, M_c, M_D]$ ($0 < x < 2$) may be formed on the base. The value of x and the content of $M_C$ and $M_D$ may be freely selected by varying the rate of evaporation of each source.

Instead of the vacuum deposition, it is also possible to form a thin film photosensitive layer on a base by a high frequency sputtering method. For instance, oxides such as $M_AO_2$ ($M_A$ is a first element with valence of 4) and $M_{B2}O_3$ ($M_B$ is a first element with valence of 3) can be used. High frequency sputtering is effected by arranging the first element $M_A$ or $M_B$ and a second element $M_C$, where $M_C$ is a metal or semimetal piece, on a target in a surface area ratio corresponding to a desired composition ratio.

It was found that the contents of the second elements in the thin film photosensitive layer vary the recording and erasing characteristics of the thin film significantly, as will be explained later. As stated above, the thin film photosensitive layer obtained by the above-stated method generally presents a pale brown color, though somewhat different according to the types of additives. When this photosensitive layer is irradiated with a light energy of a relatively long pulse width and a relatively weak power, the optical density turns to a dark brown color, which is referred to as a darkening or blackening phenomenon. When this darkened or blackened photosensitive layer is irradiated with a light energy of a relatively strong power and a relatively short pulse width, the dark portion returns to the original pale brown color, which is referred to as a whitening phenomenon. Using a laser beam, for example, when the thin film photosensitive layer is alternately irradiated with light of mutually different conditions by properly varying the irradiation power and irradiation duration, the optical density of the layer may be repeatedly increased and decreased (blackened and whitened). Generally, however, as the content of the second element increases, the laser irradiating duration for darkening or blackening becomes shorter, and the power of a laser beam necessary for whitening increases. To the contrary, when the content of a second element decreases, it is found that the irradiation duration of a laser beam for darkening or blackening becomes longer while the power of a laser beam for whitening decreases. In short, an increase of the content of a second element makes the darkening or blackening easy and whitening difficult, whereas a decrease of the content of a second element makes the darkening or blackening difficult and whitening easy. By properly determining the content of a second element, therefore, it is possible to produce an optical recording thin film photosensitive layer having recording and erasing characteristics suited to the conditions of use of the recording medium, laser power, rotating speed, or disc diameter. Generally speaking, when the content of the second element obtained in the thin film photosensitive layer exceeds 50 mol %, the power of the laser beam for whitening increases. More specifically, when using a semiconductor laser with maximum output of about 25 mW, which is a light source for small output power, it is found that the characteristics of repeatedly recording and erasing are excellent in the content range of the second element within 10 to 30 mol %, so that a thin film photosensitive layer capable of darkening or blackening and whitening satisfactorily may be obtained.

This, however, does not necessarily hold true when Te is used as the second element, and a sufficient reversibility was recognized even when its content was 70 mol %. When the content of Te as the second element was selected within the range of 10 through 70 mol %, a sufficient reversibility was obtained.

Referring now to FIGS. 5 to 8, methods of recording, reproducing and erasing information on said optical recording member are explained.

On said optical recording member, information may be recorded, reproduced and erased by using, for example, a xenon flash lamp, H-Ne gas laser, or semiconductor laser.

Figure 5:
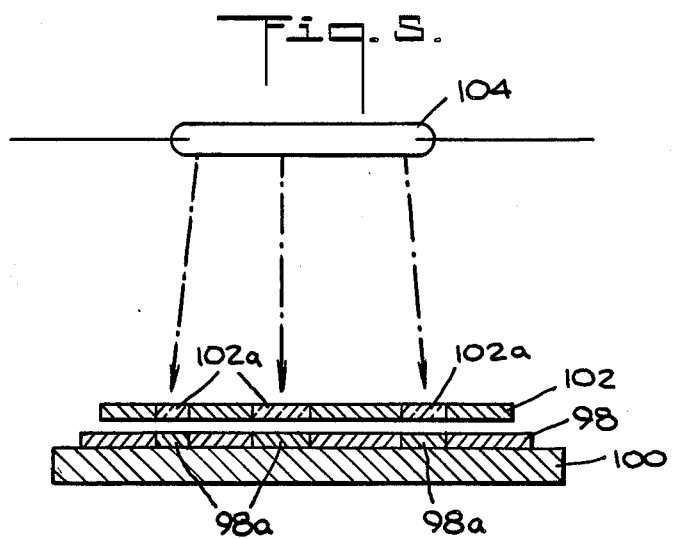
FIG. 5 is a schematic diagram showing a method or recording information on the optical recording medium by using a xenon lamp.

Relating first to a recording method by use of a xenon lamp, the process is explained in reference to FIG. 5. A thin film photosensitive layer for optical recording 98, having light absorbing characteristic which was explained in FIGS. 1 to 4, is formed on a substrate 100 to make an optical recording medium, and a mask 102 having patterns 102a locally differing in the light transmission is tightly mounted on the medium.

When illuminated by a xenon lamp 104 from above, the exposed portion 98a of the medium is darkened or blackened, and a contrast image 98a corresponding to the pattern is formed on said photosensitive layer 98. In this case, the emission width of the xenon lamp 104 is relatively long, about 1 msec, and it is difficult to whiten the darkened or blackened portion by using this lamp.

But it is possible to whiten this darkened or blackened portion by other means such as a gas laser and semiconductor laser.

Figure 6:
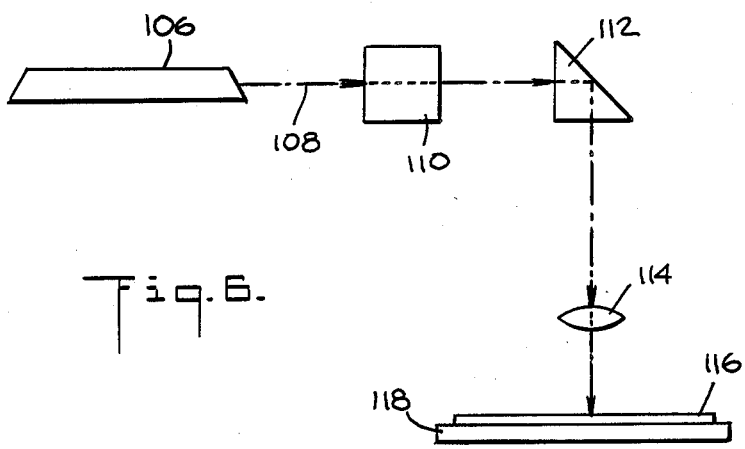
FIG. 6 is a schematic diagram showing a method of recording information on the optical recording medium by using a gas laser.

A recording method by use of a gas laser is now explained with reference to FIG. 6. A laser beam source 106 may be, for example, a H3-Ne laser ($\lambda=632.8$ nm), He-Cd laser ($\lambda=441.6$ nm), or Ar laser ($\lambda=514.5$ nm). A laser beam 108 is emitted from a laser tube 106 and undergoes an intensity modulation depending on the signal in a modulator 110, such as an electro-optical modulator or ultrasonic modulator, and is formed into a spot by a focusing lens 114 through a mirror 112. The laser beam 108 is applied to the optical recording medium at a light intensity corresponding to the signal. The medium comprises the base 118 and the thin film photosensitive layer 116 disposed thereon having light absorbing characteristics.

By the relative movement of the light beam and the optical recording medium, but signals are sequentially written on said recording medium.

Figure 7:
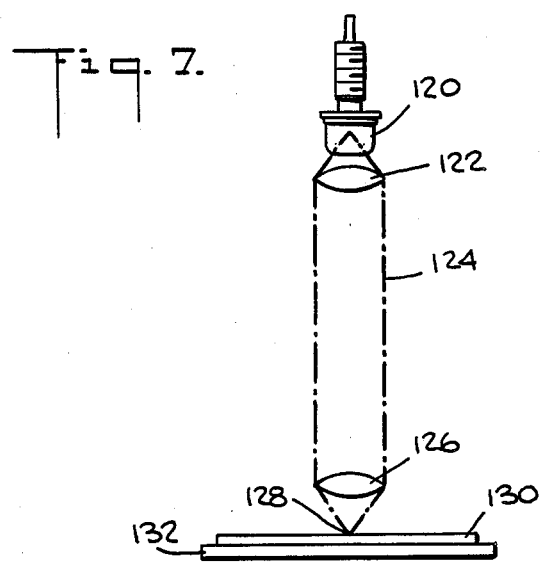
FIG. 7 is a schematic diagram showing a method of recording information on the optical recording medium by using a semiconductor laser.

FIG. 7 shows the use of a semiconductor laser ($\lambda=830$) as a laser light source. Since a semiconductor laser generally emits beams of a relatively wide spread angle of about $\pm 20$ degrees, a spot is formed by using two lenses. The beam emitted from the semiconductor laser 120 is changed to a quasiparallel light 124 by a first lens 122 and is focused to a spot light 128 by a second lens 126. Then the laser spotlight 128 is applied to the optical recording medium which comprises a base 132 and thin film photosensitive layer 130 having light absorbing characteristics, at a light intensity corresponding to the signal. When a semiconductor laser is used, internal modulation is easy, unlike the case wherein a gas laser is used, and an optical modulator is not necessary. The illuminated portion of the thin film photosensitive layer 130 is darkened or blackened, and the information is recorded as a change in the optical density. When a laser is used, the intensity or pulse width of the laser beam may be freely selected by modulating it. Therefore, when information is recorded on a whitened photosensitive layer, the information may be recorded by darkening or blackening, using a light of relatively weak and long pulse width, and the recorded information may be erased by whitening, using a light of relatively intense and short pulse width. When information is recorded on a darkened or blackened photosensitive layer, the information may be recorded by whitening, using a light of relatively intense and short pulse width, and the recorded information may be erased by darkening or blackening, using a light of relatively weak and long pulse width. Thus, either method may be employed.

At this time, it is necessary to set the irradiating light power density P (mW/$\mu$m$_2$) and irradiating light pulse width sec properly. In the thin film photosensitive layer for optical recording, the darkening or blackening light irradiating power density $P_B$ may be selected according to 0.5 mW/$\mu$m$^2 < P_B < 2$ mW/$\mu$m$^2$ and its pulse width $<\tau_B$ may be selected according to 30 nsec $<\tau_B$. The whitening light irradiating power density $P_W$ may be selected according to 2 mW/$\mu$m$^2 < P_2$; $P_W \leq P_B$ and its pulse width W may be selected according to $0 < \tau_W \leq \tau_B$. Since the speed of change may be selected faster in whitening than that in darkening or blackening, it is advantageous to record information by whitening on a previously darkened or blackened photosensitive layer and to erase by darkening or blackening it.

Relating now to methods of reproducing the thus recorded signals, the thin film photosensitive layer presents a pale brown color in the unrecorded state and when information is recorded, by darkening or blackening, turns dark in the recorded state. The optical density is increased, while the reflectivity varies at the same time. To read out recorded information signals, either light transmission type reproduction or light reflection type reproduction may be possible as shown in FIGS. 8 and 9.

Figure 8:
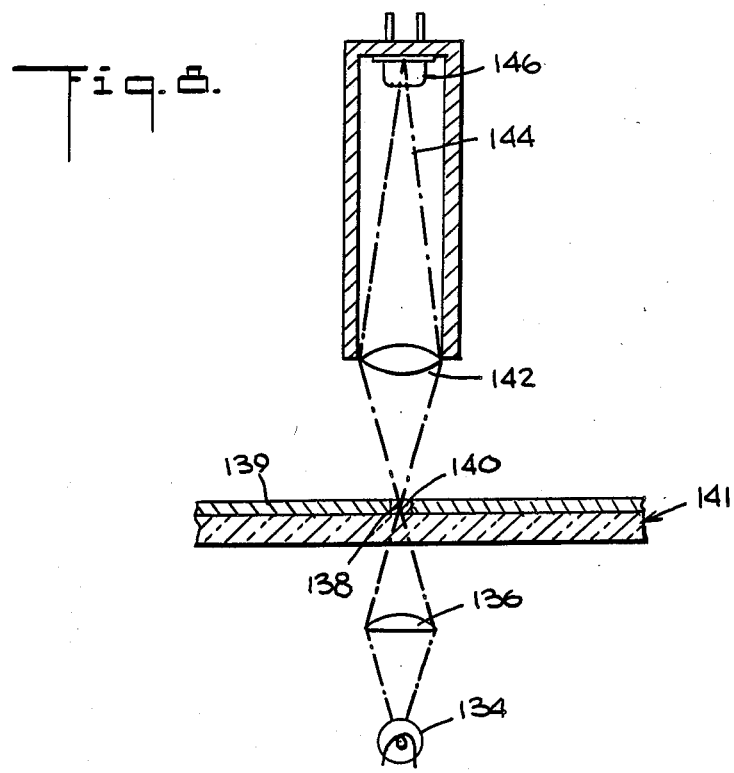
FIG. 8 is a schematic diagram showing a method of type reproduction for reproducing the signals recorded in the optical recording medium.

First referring to FIG. 8, the transmission type reproduction method is explained. As an illuminating light source 134, a tungsten lamp, He-Ne laser, semiconductor laser, light emitting diode or the like may be used. The light from this light source 134 is reduced to a spot 138 by a focusing lens 136, and the information signal image 140 which is recorded on the photosensitive layer 139 is illuminated from the back side. The transmitted light from the optical recording medium 141 passes through a lens 142 to become a detected light 144, which enters a photosensitive diode 146. The intensity of the detected light 144 is reduced to about ½ through 1/10 when the signal image 140 is illuminated as compared with that in the no-signal state. Thus the signal is reproduced by detecting the difference in intensity of the transmitted lights.

Figure 9:
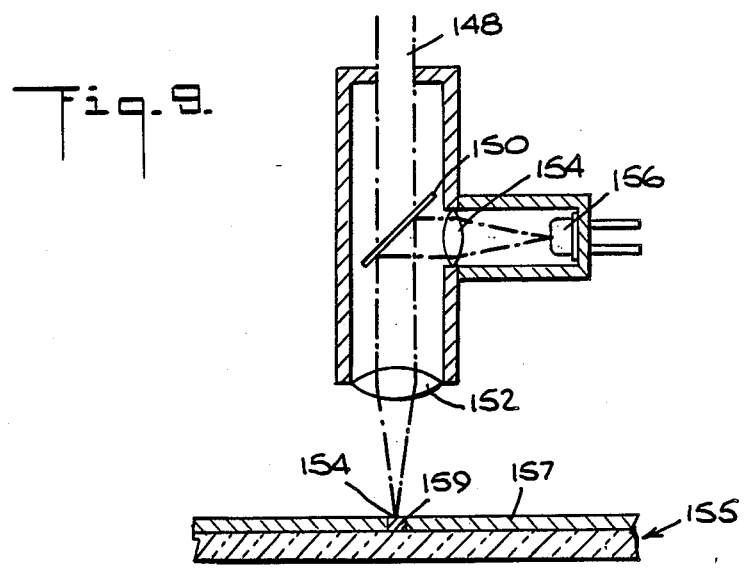
FIG. 9 is a schematic diagram showing a method of reflection type reproduction for reproducing the signals recorded in the optical recording medium.

FIG. 9 shows the reflection type reproduction method. A laser beam 148 passes through a half mirror 150 and thereafter, is focused by a focusing lens 152 and reduced into a spot light 154. The spot light 154 illuminates the signal image 159 on the photosensitive layer 157 of optical recording medium 155. The light reflected from the optical recording medium 155 passes back through the lens 152 and is reflected by the half mirror 150, and is focused by a focusing lens 154 to enter a photosensitive diode 156, from which a reproduction signal is produced.

The present invention is further described below by referring to various embodiments of the thin film photosensitive layer.

EMBODIMENT 1

Tellurium oxide $TeO_2$ and an alloy of tellurium and tin $Te_{85}Sn_{15}$ was used as sources of starting materials for vacuum deposition, and a thin film was formed by using a two-source evaporation apparatus as shown in FIG. 3. A quartz crucible was used as a heating and evaporating boat, and coil heaters were used to produce heat. A thin film photosensitive layer of about 120 μm in thickness represented by $[TeO_x:Sn]$ (where x is the ratio of the total number of atoms of Te to that of oxygen O) was formed on a PMMA resin substrate. The heating temperature of the coil heaters was set at 800° C. for the $TeO_2$ source and at 750° C. for the $Te_{85}Sn_{15}$ source.

The thin film photosensitive layer obtained in this process has a pale brown color. When this photosensitive layer was irradiated with a pulse of light for 200 nsec by using a semiconductor laser of λ=830 nm, the illuminated area of the photosensitive layer turned to a dark brown color at a power density of 0.6 mW/μm² or more. When this darkened or blackened portion is irradiated with a short pulse of light for 40 nsec at an irradiation power density of 5 mW/μm², the illuminated area was whitened to return to the original state. The spectral transmission curve of this photosensitive layer indicated a transmission of over 20% in the vicinity of the semiconductor laser wavelength of 0.8 μm as shown in curve $a_1$ in FIG. 10. The spectral transmission curve in the darkened or blackened recorded state of this thin film photosensitive layer, as indicated by curve $a_2$, was greatly decreased. Therefore, within the wavelength range of a semiconductor laser, a ΔT, or difference in transmission between darkening or blackening and whitening, of over 20% may be obtained. Recording and erasing occur due to the difference between the curves $a_1$ and $a_2$.

A similar effect was obtained when In, Ge, Zn, Tl, Bi, Pb, Al, or Cu was used as a second element instead of Sn.

Similarly, in the case where $GeO_2$ or $SnO_2$ is used as the starting material, the combination of $GeO_2$ and $Ge_{50}Te_{50}$ or $SnO_2$ and $Sn_{50}Te_{50}$ produces thin film photosensitive layers represented by $[GeO_x:Te]$ or $[SnO_x:Te]$ (0<x<2). These films, when compared with the $TeO_x$ type recording medium, exhibit a large change in the optical density, and their spectral transmission curves are respectively $b_1$ and $c_1$ in whitened state and $b_2$ and $c_2$ in the darkened or blackened state, thereby causing changes from $b_1$ to $b_2$ or $c_1$ to $c_2$ and vice versa.

These recording media present a significant quantity of change in writing, that is ΔT>30%, in the vicinity of a semiconductor laser wavelength of 0.8 μm. However, the recording sensitivity was slightly lower. When the recording media was irradiated with a pulse light for 200 nsec, they were darkened or blackened at a power density of 1 mw/μm² or more. When the darkened or blackened area was irradiated with a short pulse light for 40 nsec at a power density of 7 mW/μm² or more the illuminated area turned to the original pale state. In the case of thin film photosensitive layers represented by $[GeO_x:Te]$ or $[SnO_x:Te]$ (0<x<2), various additives such as Zn, In, Tl, Bi, Pb, Al, Cu, Sb, Ge and Sn were studied in addition to Te and reversible changes were noted in all the additives. The effect was greater when at least one of Te or Sb was added to a composition represented by $GeO_x$, or at least one of Ge, Te or Sb was added to a composition represented by $SnO_x$, than when other additives were used.

EMBODIMENT 2

A bismuth oxide $Bi_2O_3$ and an alloy of bismuth and tellurium $Bi_{50}:Te_{50}$ were used as starting materials of evaporation, and a photosensitive layer represented by $[BiO_x:Te]$ was formed by the same process as in embodiment 1. The heating temperature of the coil heaters was set at 850° C. for the $Bi_2O_3$ source and 700° C. for the $Bi_{50}Te_{50}$ source, and thereby, a pale brown thin film photosensitive layer of about 120 nm in thickness was obtained. The thin film photosensitive layer presented by $[BiO_x:Te]$ was able to vary its optical density at a relatively low energy.

When this thin film photosensitive layer was irradiated with a pulse light for 200 nsec by use of a semiconductor laser with wavelength of 830 nm, the photosensitive layer turned to a grayish brown color at a power density of 0.5 mW/μm² or more. When this darkened or blackened portion was irradiated with a pulse light for 40 nsec, the illuminated portion was whitened at a power density of 4 mW/μm² or more, and thereby returned to the original state. The spectral transmission curve in the whitened state of this thin film photosensitive layer was shown by curve $d_1$ in FIG. 11, and that in the darkened or blackened state was shown by curve $d_2$, and the change in transmission between darkened or blackened state and whitened state, that is, the quantity of change of writing in the vicinity of a semiconductor laser wavelength of 0.8 μm, was $\Delta T \approx 10\%$.

When other second elements, such as Ge, Sn, In, Zn, Tl, Bi, Pb, Al or Cu were used instead of Te, similar effects could be obtained, but the effect of Te was particularly high.

Similarly, with the combination of $Sb_2O_3$ and $Sb_{50}Te_{50}$, $Tl_2O_3$ and $Tl_{75}Te_{75}$, or $In_2O_3$ and $In_{50}Te_{50}$, thin film photosensitive layers represented by [$BiO_x$:Te], [$TlO_x$:Te], or [$InO_x$:Te] ($0 < x < 1.5$) could be obtained.

Figure 11:
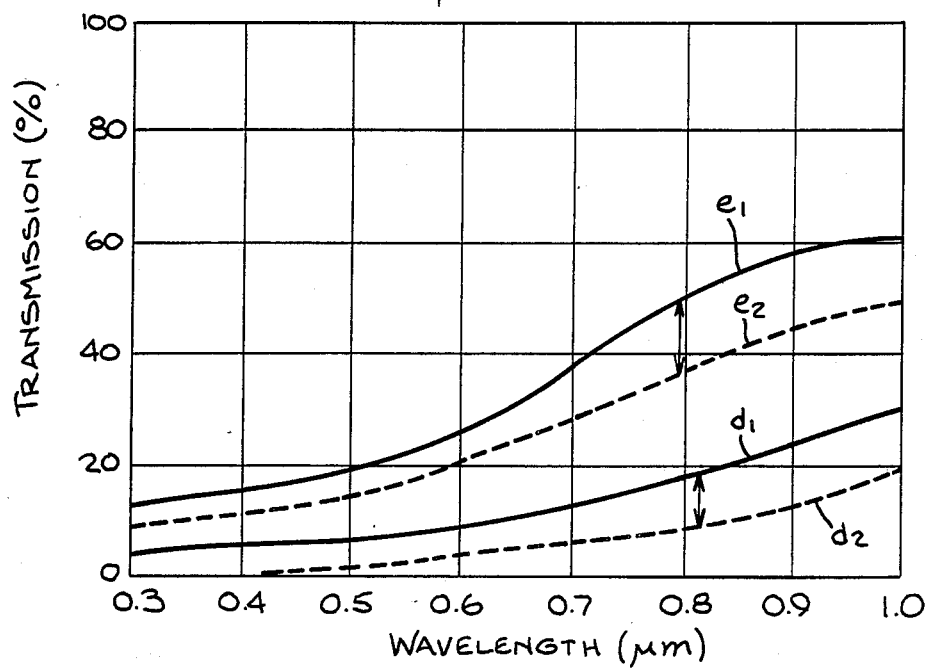
Figure 12:
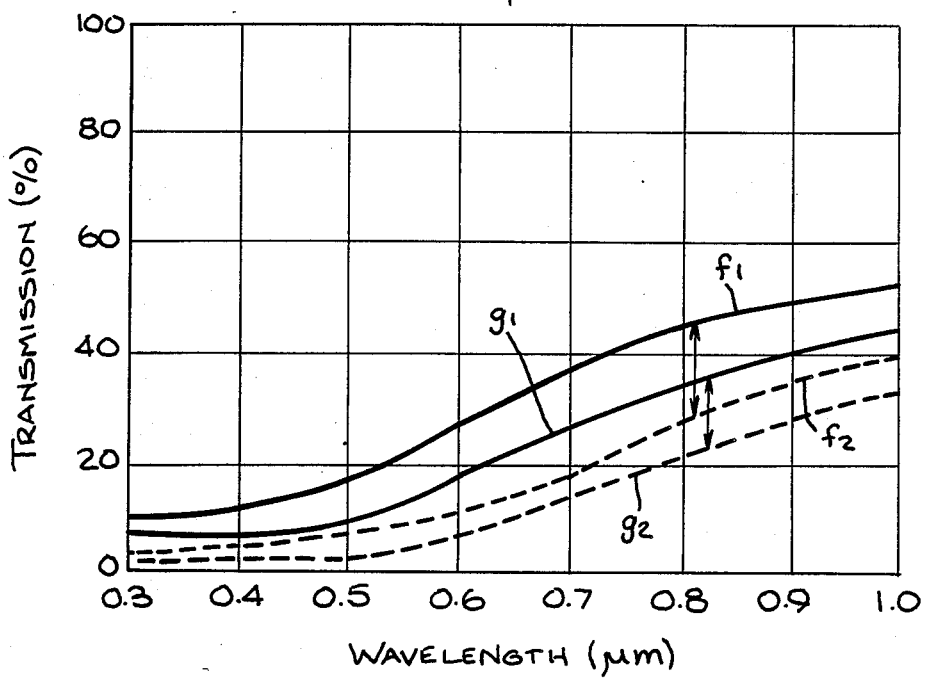

FIGS. 11 and 12 show the respective spectral transmission curves before and after darkening or blackening, wherein $d_1$, $e_1$, $f_1$ and $g_1$ refer to the whitened state, and $d_2$, $e_2$, $f_2$, and $g_2$ relate to the blackened state. In individual films the state changes from $d_1$ to $d_2$, $e_1$ to $e_2$, $f_1$ to $f_2$, $g_1$ to $g_2$, and vice versa. These films, when compared with the thin film photosensitive layers which contain a composition represented by [$TeO_x$] explained in embodiment 1, were almost equal in the recording sensitivity but were slightly smaller in the change in optical density. The change in the vicinity of a semi-conductor wavelength of 0.8 m was about $\Delta T \approx 10$ to $15\%$.

Also in the case of thin film photosensitive layers including composition represented by [$BiO_x$], [$SbO_x$], [$TlO_x$] or [$InO_x$] ($0 < x < 1.5$), other second elements such as Zn, In, Tl, Bi, Pb, Al, Cu, Sb, Ge and Sn, were tested instead of Te and reversible changes were observed in all these second elements, but the effect was particularly excellent when at least one of Te, Sb or Ge was added to the [$BiO_x$] type photosensitive layer, at least one of Te or Ge was added to the [$SbO_x$] type layer, Te was added to the [$TlO_x$] type layer, and at least one of the Te, Sb or Ge was added to the [$InO_x$] type layer.

It is also possible to vary the sensitivity and $\Delta T$ or writing change quantity, by combining several materials of embodiments 1 and 2.

EMBODIMENT 3

When three evaporating sources, $TeO_2$, Te and Sn, are used as the starting materials, a thin film photosensitive layer was formed by using a four-source type evaporating apparatus as shown in FIG. 4. As a heating and evaporating boat, a copper crucible was used, and the sources were directly heated by an electron beam to form a thin film photosensitive layer represented by [$TeO_x$:Sn] ($x \approx 1.0$) in a thickness of about 120 nm, on an PMMA resin substrate. The evaporation rate of each source was 5 Å/sec for both Te and $TeO_2$ and ranged from 0.1 to 5 Å/sec for Sn in order to control the content of each element in the final product of the thin film photosensitive layer.

Figure 13:
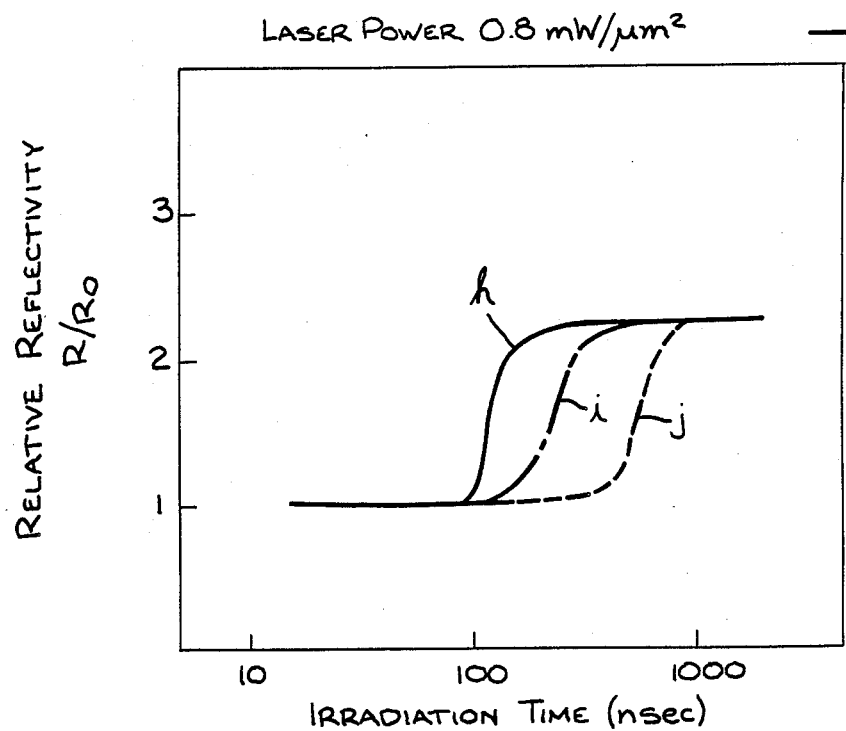
FIG. 13 shows the relation between the relative reflectivity of the optical recording medium and the laser beam irradiation time when the power of the irradiating laser is 0.8 mW/$\mu$m$^2$.

The thin film photosensitive layer obtained in this method had a pale brown color. When this photosensitive layer was irradiated with a laser beam by use of a semiconductor laser having a wavelength of 830 nm, the layer was darkened when the power density of the laser beam irradiation was greater than 0.6 mW/μm², and its reflectivity R increased to about double the reflectivity $R_o$ in its original pale state. FIG. 13 shows the results of the investigation of the darkening or blackening characteristics due to the difference in the content of Sn when the irradiating power density of a laser beam of 0.8 mW/μm², wherein h, i, and j refer to a Sn content of 20, 10, and 5 mol %, respectively. From the graph in FIG. 13, it is seen that the laser irradiation time required for darkening or blackening of the thin film photosensitive layer represented by [$TeO_x$:Sn] (where $x \approx 1.0$) becomes shorter when the Sn content increases, that is, the darkening or blackening becomes easier.

Figure 14:
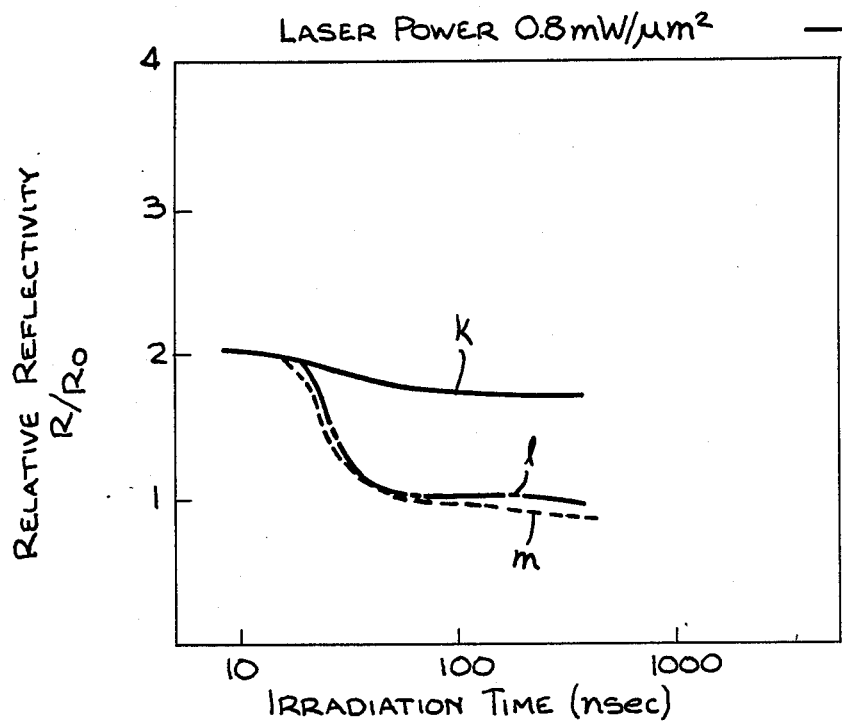
FIG. 14 shows the relation between the relative reflectivity of the optical recording medium and the laser beam irradiation time when the power of the irradiating laser is 6 mW/$\mu$m$^2$.

The darkened or blackened region of the thin film photosensitive layer, which was irradiated with a laser beam having a power density of 0.8 mW/μm², was further irradiated with a laser beam of enhanced power density. The illumination region was whitened at a power density of over 5 mW/μm², and the reflectivity returned to the original level. FIG. 14 shows the results of the investigation of the difference in the whitening characteristics according to the content of Sn when the thin film photosensitive layer was irradiated with a laser beam at a power density of 6 mW/μm², in which k, l and m correspond to a Sn content of 20, 10 and 5%, respectively. From this graph, it is shown that the laser beam irradiation duration required to whiten the thin film photosensitive layer represented by [$TeO_x$:Sn] ($x \approx 1.0$) is constant regardless of the Sn content but that the degree of whiteness varies according to the content of Sn, that is, the layer is sufficiently whitened at 5% and 10%, but not at 20%. In this case, however, it was found that whitening was sufficient if the Sn content was high when the laser irradiation power was raised. From this fact, it is estimated that the irradiation power of a laser for whitening gradually increases when the Sn content is heightened until it is impossible to whiten. Thus, when the Sn content is low, whitening is easy but darkening or blackening is difficult, and when the Sn content is high, darkening or blackening is easy but whitening is difficult, which gives rise to the necessity of selecting the content according to the conditions of use of the recording medium. The spectral transmission curve of this thin film is similar to the profile shown in FIG. 10. That is to say, as indicated by curve $a_1$ in FIG. 10, the transmission is over 20% in the vicinity of a semiconductor laser wavelength of 0.8 μm. The spectral transmission curve in the darkened or blackened recorded state of this photosensitive layer is greatly reduced as indicated by curve $a_2$ in the same graph, and a transmission difference at $\Delta T$ between darkening or blackening and whitening, i.e., the writing quantity difference, of over 20% may be obtained in the vicinity of a erasing takes place due to the change between these two states $a_1$ and $a_2$.

Figure 15:
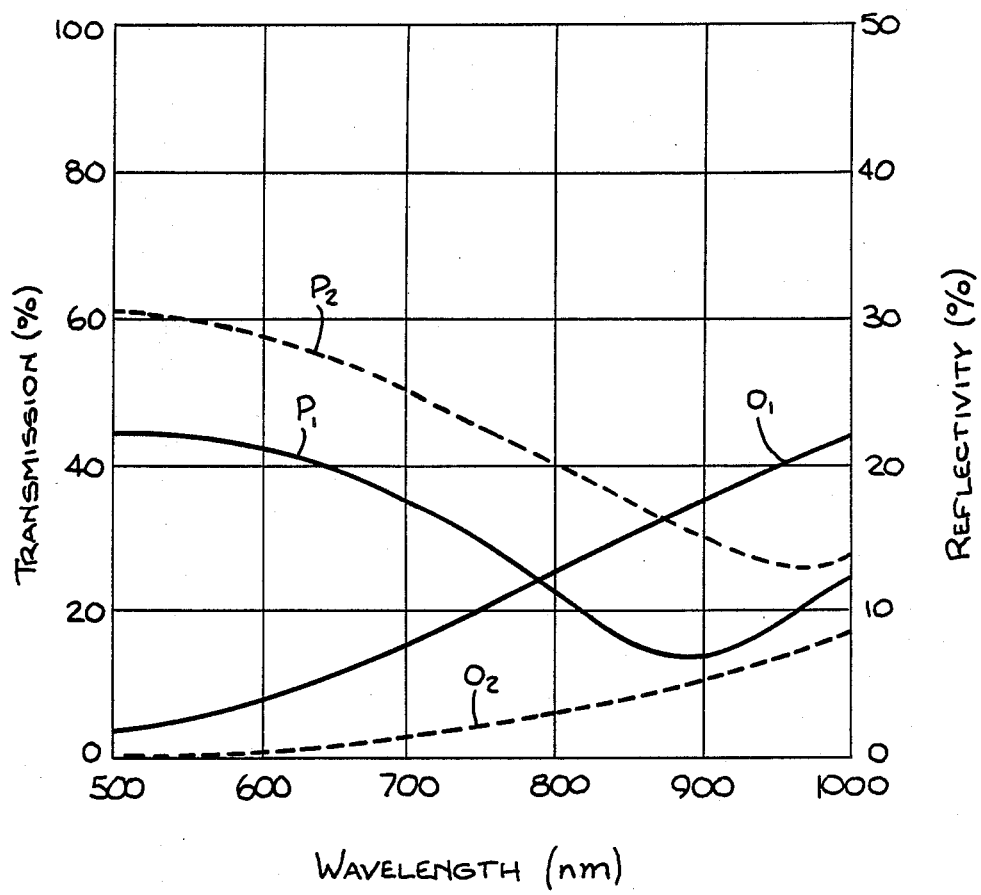
FIG. 15 shows spectral transmission and reflection curves of the optical recording medium.

FIG. 15 describes the spectral transmission and spectral reflectivity of the same thin film at a Sn content of 10 mol %, wherein $o_1$ and $p_1$ refer to the transmission and reflectivity in the whitened state and $o_2$ and $p_2$ are those in the darkened or blackened state. As evident from this graph, in the vicinity of a semiconductor laser beam wavelength of 830 nm, a transmission change $\Delta T$ of over 20% and a reflectivity change $\Delta R$ of about 10% may be obtained. Recording and erasing occur due to repeated changes between these two states.

EMBODIMENT 4

Figure 16:
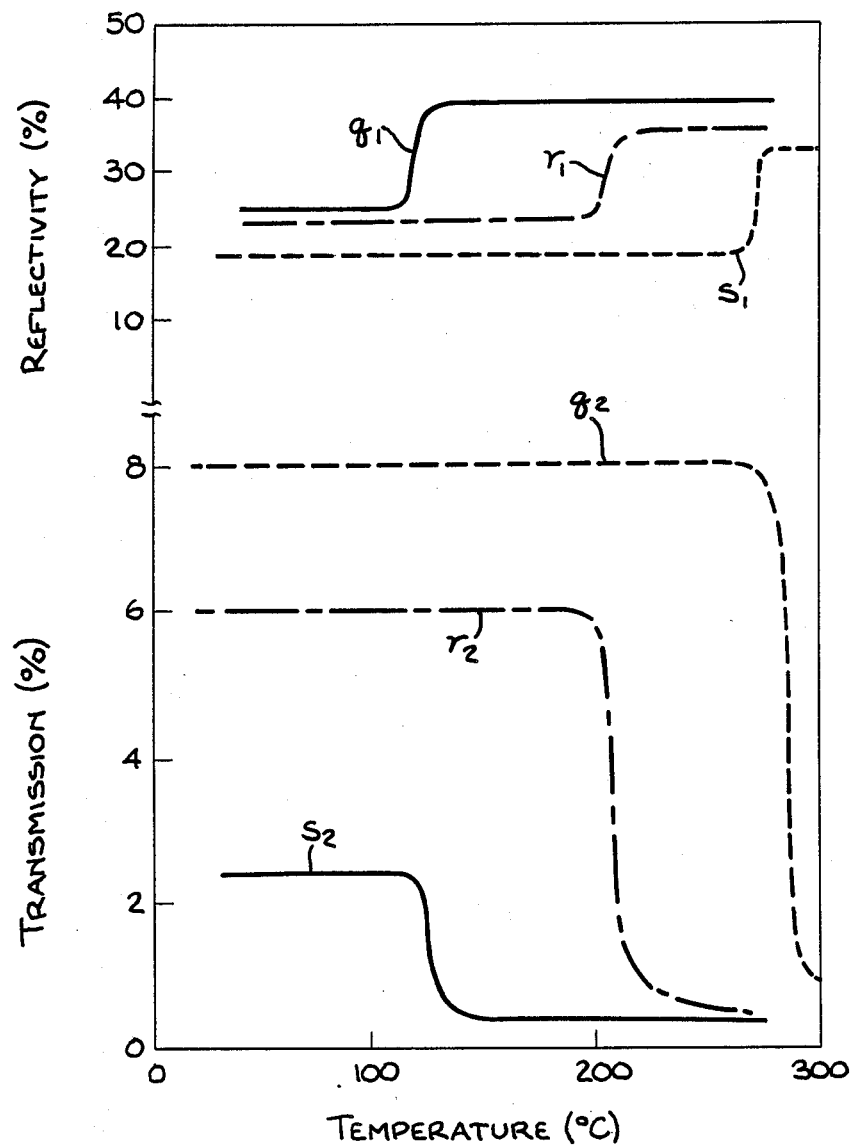
FIG. 16 shows the relation between the reflective factor, the transmission of the optical recording medium, and the temperature.

When $TeO_2$, Te and Ge as the starting materials were used, a thin film photosensitive layer represented by [$TeO_x$:Ge] ($x \approx 1.0$) was formed in a thickness of about 150 nm by the same process as described in embodiment 3. The thin film photosensitive layer obtained by this method had a slightly yellowish brown color of a very large transmission. When this film photosensitive layer which contains germanium Ge, in an amount of about 10 mol %, was irradiated with a laser beam by the use of a semiconductor laser having a wavelength of 830 nm, the layer was not darkened or blackened when the laser irradiating power density was less than 1 mW/$\mu$m$^2$, and it was harder to darken or blacken than the thin film photosensitive layer containing Sn. After darkening this layer with a power density of 1.5 mW/$\mu$m$^2$, it was whitened when the power density was intensified to over 7 mW/$\mu$m$^2$ and returned to the original state. FIG. 16 shows the changes in the transmission and reflectivity of the photosensitive layer to a He-Ne laser while heating, slowly at a rate of 1° C./sec, the photosensitive layer containing Ge in an amount of 5 to 20 mol %. When the thin film photosensitive layer represented by [TeO$_x$:Ge] (x$\approx$1.0) was gradually heated, the layer suddenly turned dark or black at a certain temperature, and its transmission decreased while the reflectivity increased. In this diagram, q$_1$, q$_2$, r$_1$, r$_2$, s$_1$ and s$_2$ refer to a Ge content of 5, 10, and 20 mol %, respectively. In all cases, the transmission decreased and the reflectivity increased. As the Ge content increased, the darkening or blackening temperature of the layer was suddenly elevated, and the darkening or blackening tended to be more difficult at a low temperature such as room temperature. Apparently, Ge functions to heighten the thermal stability of the thin film photosensitive layer in the whitened state. In particular, when the Ge content was within the range of 5 to 10 mol %, the transition temperature rose by about 80° C., and it was found that a slight change in the Ge content could control the darkening or blackening characteristics and thermal stability of recorded signals. In the case of Sn as explained in embodiment 3, this effect was not clear. Accordingly, from embodiment 3 and 4, it was found that, by properly changing the contents of Sn and Ge, the darkening or blackening characteristics, whitening characteristics, and thermal stability of the thin film photosensitive layer could be properly controlled according to conditions such as recording time, erasing time, environmental conditions and laser power.

By use of the four-source vacuum deposition apparatus shown in FIG. 4, several trial thin film photosensitive layers [Te:O$_x$:Sn, Ge] (where x$\approx$1.0) were prepared by varying the contents of Sn and Ge. These photosensitive layers were irradiated with semi-conductor laser beams with a wavelength of 830 nm and their recording characteristics were studied. As a result, when the Sn content was selected within the range of 10 through 30 mol % and the Ge content was selected within the range of the slightest trace through a maximum of 10 mol %, practicable characteristics such as recording sensitivity were obtained by using a semiconductor laser, of about 25 mW output, which belongs to the currently mass produced class.

EMBODIMENT 5

The above-stated four sources, Te, TeO$_2$, Sn and Ge, were simultaneously evaporated on a base to form a thin film photosensitive layer represented by [TeO$_x$:Sn, Ge] (where x$\approx$1.0). The characteristics of the layer were examined by varying the value of x in TeO$_x$, i.e., the ratio of Te and TeO$_2$ in the photosensitive layer, with the Sn content set at 15 mol % and the Ge content at 5 mol %. As a result, the whitening sensitivity tended to be low when the composition ratio of TeO$_2$ increased and x exceeded 1.5. It was necessary to repeat the recording at intense irradiating power, which caused damage to the photosensitive layer and base, and the storability of the recorded bits (whitened bits) declined. To the contrary, when the ratio of TeO$_2$ decreased and x became less than 0.1, the darkening or blackening sensitivity lowered and deterioration due to humidity increased. It was hence found that favorable recording and erasing characteristics and storability may be obtained within the range of 0.1$\leq$x$\leq$1.5. In particular, when the value of x was selected within the range of 0.2$\leq$x$\leq$1.2, recording and erasing could be repeated satisfactorily, at a practical laser power and recording and erasing speed, while the deterioration due to humidity was smaller.

Figure 17:
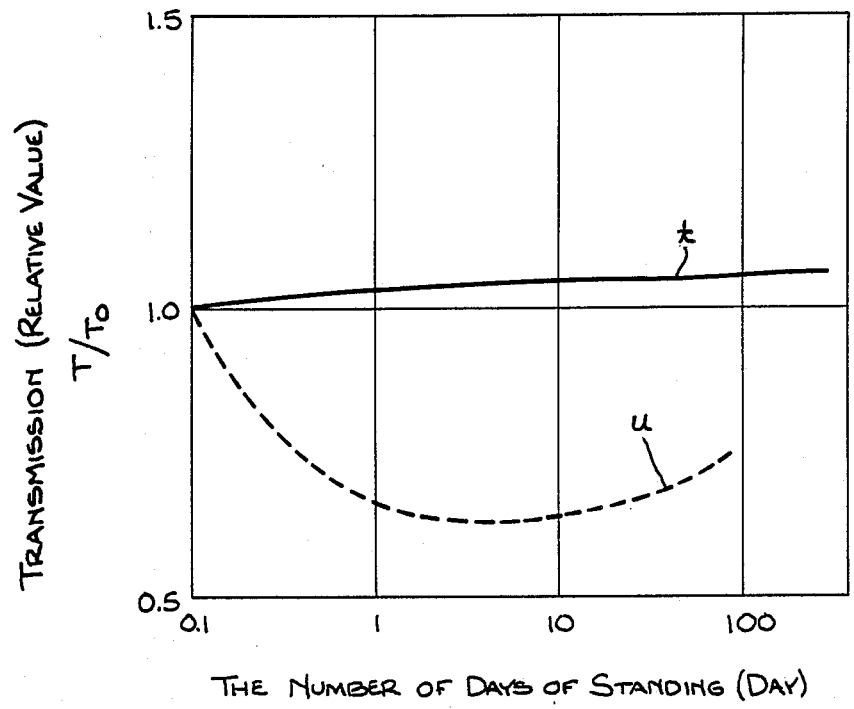
FIG. 17 shows the relations between the transmission (relative) of the optical recording medium and the number of days of standing.

FIG. 17 shows the results of the investigation of changes in the transmission in an atmosphere of temperature 50° C. and relative humidity 90% RH, relating to the thin film photosensitive layer represented by [TeO$_x$:Sn$_{15}$, Ge$_5$] where x is about 0.33 (Te$_{60}$Sn$_{15}$Ge$_5$O$_{20}$), evaporated on a glass base, shown by curve t. FIG. 17 also shows another thin film photosensitive layer represented by [TeO$_x$:Sn$_{15}$,Ge$_5$] where x is about 0.07 (Te$_{75}$Sn$_{15}$Ge$_5$O$_5$) shown by curve u. The former was slightly increased in the transmission initially but shortly reached the state of saturation, not changing significantly after the lapse of 100 days, whereas as to the latter prompt darkening or blackening proceeded and thereafter the transmission was gradually recovered.

When the former photosensitive layer was taken out after the lapse of 100 days and was irradiated with a semiconductor laser beam, it reached the saturation of darkening or blackening in about 500 nsec at an irradiating power of 1 mW/$\mu$m$^2$. When this darkened portion was irradiated with a pulse light for about 50 nsec at a power of 7 mW/$\mu$m$^2$, the irradiated portion was whitened.

EMBODIMENT 6

By the use of In, Zn, Tl, Bi, Pb, Al, Cu or Sb as the second elements instead of Sn or Ge, experiments similar to those in embodiments 3 and 4 were made. As a result, a pale brown colored thin film photosensitive layer was obtained in all cases. In these photosensitive layers, darkening or blackening and whitening phenomena were recognized when the content z of the second element was according to 0<z<50 mol %. Especially in a range of 10$\leq$z$\leq$30 mol %, the recording and erasing performance could be confirmed in a disc form by the use of a method which will be explained in embodiment 10 below. Of these substances, In and Bi presented effects similar to those of Sn. It was found that Bi and In contributed to enhance the light absorption rate of the photosensitive layer, and at the same time, control the rate of darkening or blackening by varying the content thereof. The second element Sb was effective to increase the transmission without varying the darkening or blackening temperature, while Pb was effective to decrease the transmission without varying the darkening or blackening temperature. For instance, Sb was useful for increasing the transmission variation $\Delta$T in a recording and reproducing system to detect penetrating light, and Pb was useful for improving the light absorption efficiency of the thin film photosensitive layer. Meanwhile, a photosensitive layer containing Tl as a second element was found to be extremely high in recording and erasing sensitivity.

EMBODIMENT 7

Three sources of GeO$_2$, Ge and Te, were used as starting materials to form a thin film photosensitive layer represented by [GeO$_x$:Te], where x is about 1.0, containing Te, in an amount of about 30 mol %, by use of the apparatus shown in FIG. 4. The vacuum deposition speed from three sources, GeO$_2$ Ge and Te, was set at 5 Å/sec, 5 Å/sec, and 2 Å/sec, respectively, and the film thickness was set at about 150 nm. The thin film photosensitive layer obtained had a yellowish brown color, and a relatively large energy was required to change the optical density thereof.

When this thin film was irradiated with a pulsive light for 200 nsec at an irradiation power of over 1.0 mW/μm$^2$, the irradiated portion turned dark or black. When this blackened portion was irradiated with a short pulsive light for 40 nsec at a power density of over 7 mW/μm$^2$, the irradiated portion returned to the original pale color. These changes in the optical density were greater than those in the TeO$_x$ type photosensitive layer, and the spectral transmission curve was almost similar to the curve shown in FIG. 10, wherein curve b$_1$ refers to the transmission in the whitened state and curve b$_2$ refers to the darkened or blackened state. The thin film photosensitive layer represented by [GeO$_x$:Te], where x is about 1.0, changes from b$_1$ to b$_2$, and b$_2$ to b$_1$, depending on the irradiating conditions of the laser beam. In the vicinity of a semiconductor laser wavelength of 830 nm, the transmission variation ΔT was greater than 30%. Concerning the content z of the second element Te, a reversible characteristic was noted at a very slight trace, and a large variation was obtained from around 10 mol %. Reversible changes were recognized up to about 70 mol %, and the whitened region was stable. Exceeding 70 mol %, however, the stability of the film was slightly lowered.

Figure 10:
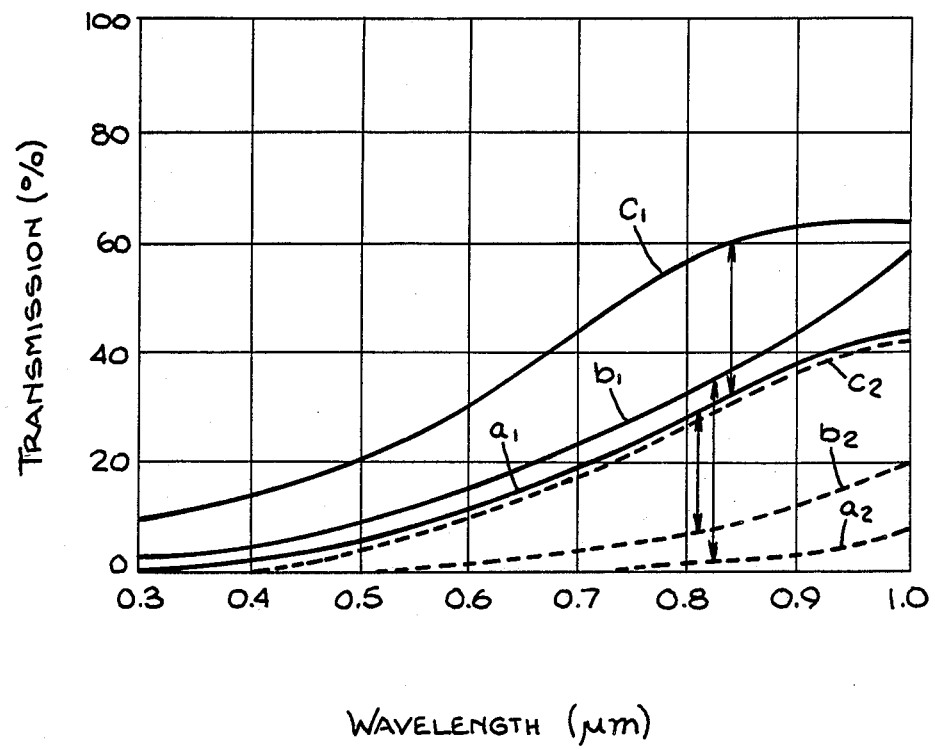
FIGS. 10 through 12 show the relation between the optical transmission factor of the recording medium and the wavelength of laser beam.

When Zn, In, Bi, Pb, Al, Cu, Sb or Sn were used as a second element, reversible changes were recognized with a second element at a content z of 50 mol % or less in all elements, and a particularly excellent reversible characteristic was observed when the content of Bi, In, Sn, Sb, Pb or Zn was selected within the range of 10 through 30 mol %, especially when Te was also used and the contents of Te and other elements Z$_1$ and Z$_2$ were selected within the range (mol %) of $10 \leq z_1 \leq 30$ mol %, $0 < z_2 \leq 50$ mol %, and in total, 10 mol % $< z_1 + z_2 \leq 70$ mol %. Then, conforming to the process of embodiment 7, SnO$_2$, Sn and Te were used as the starting materials to form a thin film photosensitive layer containing Te in a thickness of about 120 nm, and a brown thin film was obtained. These thin film photosensitive layers were, like the above-stated [GeO$_x$:Te] type photosensitive layer, blackened when irradiated with a laser beam having a pulse width of 200 nsec and an irradiating power of over 1 mW/μm$^2$, and were whitened when irradiated with a short pulsive light of 40 nsec at a power density of over 7 mW/μm$^2$. In FIG. 10, c$_1$ and c$_2$ are the curves of the spectral transmission in the whitened state and the darkened or blackened state, respectively, of a thin film photosensitive layer represented by [SnO$_x$:Te] where x is about 1.0 and containing Te, in an amount of about 20 mol %. Also, in this case, changes from c$_1$ to c$_2$ and vice versa were observed by varying the irradiating conditions of the semiconductor laser beam. Again, an adequate content of Te was within the range of 10 through 70 mol %.

As other second elements, when Ge, Bi, Pb, In, Zn or Sb were used at a content of 10 to 30 mol %, obvious reversible changes were observed, and particularly excellent reversible characteristics and stability were obtained when one of Bi, Pb, In, Zn or Sb was combined with Te or Te and Ge, with their contents z$_1$, z$_2$ and z$_3$ selected respectively within the ranges of $10 \leq z_1 \leq 30$, $0 < z_2 \leq 50$, $0 < z_3 \leq 10$, and $10z_1 + z_2 + z_3 \leq 70$ mol %.

In a [GeO$_x$] type film or in a [SnO$_x$] type film, if the value of x is small, the second element should be in a somewhat larger quantity, and when x is greater, its content should be slightly decreased in order to heighten the reversibility. In these photosensitive layers, as in the case of a [TeO$_x$] type photosensitive layer, the reversibility and stability were excellent when the value of x was selected within the range of $0.2 \leq x \leq 1.2$.

EMBODIMENT 8

Three sources, Bi$_2$O$_3$, Bi and Te, were used as the starting material for vacuum deposition, the rate thereof was set at 5 Å/sec, 10 Å/sec, and 2 Å/sec, respectively. A thin film photosensitive layer represented by [BiO$_x$:Te], where x is about 0.8, was formed in a thickness of about 100 nm, and contained Te in an amount of about 30 mol %. The obtained photosensitive layer had a slightly grayish pale brown color, and the optical density could be changed at a relatively low energy.

When this thin film photosensitive layer was irradiated with pulsive light for 200 nsec by the use of a semiconductor laser with a wavelength of 830 nm, it turned to a grayish brown color at an irradiating power density of about 0.5 mW/μm$^2$. When this darkened region was irradiated with pulsive light for 40 nsec, the irradiated portion was whitened and returned to the original pale color at an irradiating power density of over 4 mW/μm$^2$.

In FIG. 11, d$_1$ and d$_2$ are the curves of the spectral transmission in the whitened state and darkened or blackened state, respectively, of this thin film photosensitive layer. In the [BiO$_x$:Te] type layer, the change in the optical density was relatively small with a semiconductor laser having a wavelength of 830 nm, and a transmission variation ΔT of about 10% was obtained.

The second element or elements acted almost the same as observed in the previous embodiments of [GeO$_x$] and [SiO$_x$] type layers, and similar effects were obtained when Ge, Sn, In, Zn, Tl, Bi, Pb, Al and Cu were used as the second element. In particular, when both Te and Ge were used as second elements, and their contents z$_1$ and z$_2$ were selected within the ranges of $10 \leq z_1 \leq 70$, $0 \leq z_2 \leq 10$, and $10 < z_1 + z_2 \leq 70$ mol %, excellent characteristics were obtained in both reversibility and stability. In this case also, the content of the second elements depended on the value of x in [BiO$_x$], and when x was closer to 1.5, only a slight content of the second element was sufficient, but when it was near to 0, a somewhat larger content was required. In the [BiO$_x$] type layer, the range of $0.2 \leq x \leq 1.3$ was appropriate for repetition of recording and erasing, and the stability of the recorded bits in the thin film photosensitive layer.

Similar to the method, with respect to the [BiO$_x$] type film, three sources of Sb$_2$O$_3$, Sb and Te, another three sources of In$_2$O$_3$, In and Te, and still another three sources of Tl$_2$O$_3$, Tl and Te were used to form thin film photosensitive layers excelling in reversible changes, namely [SbO$_x$:Te] (x being about 0.8), [InO$_x$:Te] (x being about 0.8), and [TlO$_x$:Te] (x being about 0.8). The Te contents were about 30 mol % in all of them.

FIGS. 11 and 12 show the spectral transmission curves in the whitened state d$_1$, e$_1$, f$_1$ and g$_1$ and in the blackened state d$_2$, e$_2$, f$_2$ and g$_2$ When the thin film photosensitive layers of [BiO$_x$:Te], [SbO$_x$:Te], [InO$_x$:Te], and [TlO$_x$:Te] types were irradiated with a laser beam of relatively low power (about 0.6 mW/$\mu$m$^2$) and a relatively long pulse (about 500 nsec), they were blackened, and the transmission decreased from d$_1$ to d$_2$, e$_1$ to e$_2$, f$_1$ to f$_2$ and g$_1$ to g$_2$, respectively, while the reflectivity increased. When irradiated with a laser beam of relatively large power (about 6 mW/$\mu$m$^2$) and a relatively short pulse (about 40 nsec), they were whitened, and the transmission increased from d$_2$ to d$_1$, e$_2$ to e$_1$, f$_2$ to f$_1$ and g$_2$ to g$_1$, respectively, while the reflectivity decreased to the initial level.

These photosensitive layers were similar to the [TeO$_x$] type layer with respect to the recording sensitivity, but were somewhat smaller with respect to the change in the optical density. The transmission variation $\Delta$T was about 10% and the reflectivity variation $\Delta$R was about 5 to 10% with a semiconductor laser wavelength of 830 nm.

The content of Te could be selected within the range of 10 through 70 mol %.

In the case of [SbO$_x$], [InO$_x$], [TlO$_x$] (0<x<1.5) type thin film photosensitive layers, Zn, In, Tl, Bi, Pb, Al, Cu, Sb, Ge and Sn were studied as the second element, and reversibility was recognized in all elements up to a maximum of 50 mol %. The reversibility and stability were particularly excellent when the content was selected within the range of 10 to 30 mol %.

When these second elements were combined with Te, or with both Te and Ge, both the variation and stability were improved. It was found that Te was very effective for its absorption while Ge was very effective for the stability of the whitened state. At the time, the maximum practical content of Ge was about 10 mol %, and the darkening or blackening was difficult at a higher content. Regarding the total content of the second elements, reversibility was recognized at a maximum of 70 mol %.

Thin film photosensitive layers of [BiO$_x$:Te], [SbO$_x$:Te], [InO$_x$:Te] and [TlO$_x$:Te] containing Te in an amount of 20 mol % were studied in order to find the optimum value of x. For instance, by varying the temperature of the Bi source and the Bi$_2$O$_3$ source and forming thin film photosensitive layers of various x values, it was found that there was no practical problem within the range of 0.2≦x≦1.0. The recording characteristics and weatherability (temperature resistance and humidity resistance) at 50° C. and 90% RH atmosphere were studied by use of the method described in embodiment 11.

EMBODIMENT 9

Using a four-source type vacuum deposition apparatus such as shown in FIG. 4, two of the four sources were TeO$_2$ and Te and the other two were selected from Ge, Bi, Sn, Sb, In and Pb and [TeO$_x$:$\alpha_1,\alpha_2$], where $\alpha_1$, $\alpha_2$ are second elements (0<x<2). A PMMA resin base was used. As a result, thin film photosensitive layers excelling in both sensitivity and stability, as compared with film containing only one second element were obtained, of which examples were [TeO$_x$:Ge, Bi], [TeO$_x$:Ge, Sn], [TeO$_x$:Ge, Sb], [TeO$_x$:Ge, Pb], [TeO$_x$:In, Bi] and [TeO$_x$:Ge, In].

In these layers, darkening or blackening and whitening changes were recognized with a total content of the second elements of 50 mol % or less. It is also possible to vary the characteristics by using more elements.

EMBODIMENT 10

Figure 18:
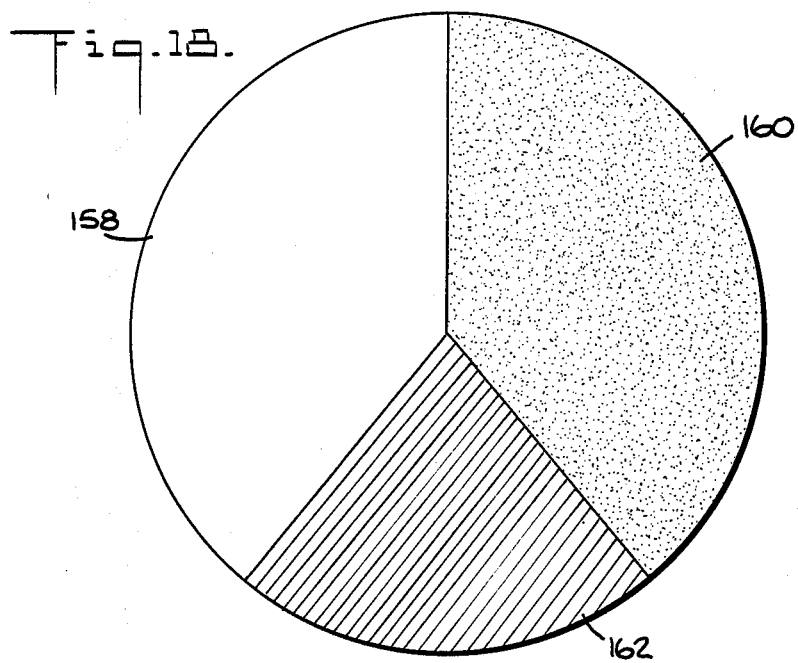
FIG. 18 is a plan view showing a target used in the manufacture of the optical recording medium by a high frequency sputtering method.

The following examples relates to production of a thin film by a sputtering method. FIG. 18 is a plan of a disc shaped target 4 inches in diameter and 5 mm in thickness used in the sputtering process. A target main body 158 is composed of TeO$_2$ of which sector plates of Te 160 and Sn 162 are arranged at a surface area ratio of TeO$_2$:Te:Sn equal to 2:2:1. In this state, sputtering was continued for 10 minutes in an argon Ar gas atmosphere, and a pale brown colored thin film was obtained. When this film was irradiated with a semi-conductor laser beam with a wavelength of 830 nm for 500 nsec at an irradiating power density of 0.8 mW/$\mu$m$^2$, the irradiated portion was blackened. When this blackened portion was irradiated for 50 nsec at a power density of 7 mW/$\mu$m$^2$, the irradiated portion returned to an original pale color state.

In the embodiments explained so far, at least part of the second element exists in the photosensitive layer in a non-oxide state, and at least part of the second element is present in the photosensitive layer in a metal or semi-metal state. Further, at least part of the second element forms an intermetallic compound (for example, Te-Ge) together with part of the first element within said photosensitive layer. Still, at least part of the first element forms an oxide of stoichiometric composition when the first element has the maximum valence in a stable state.

Figure 19:
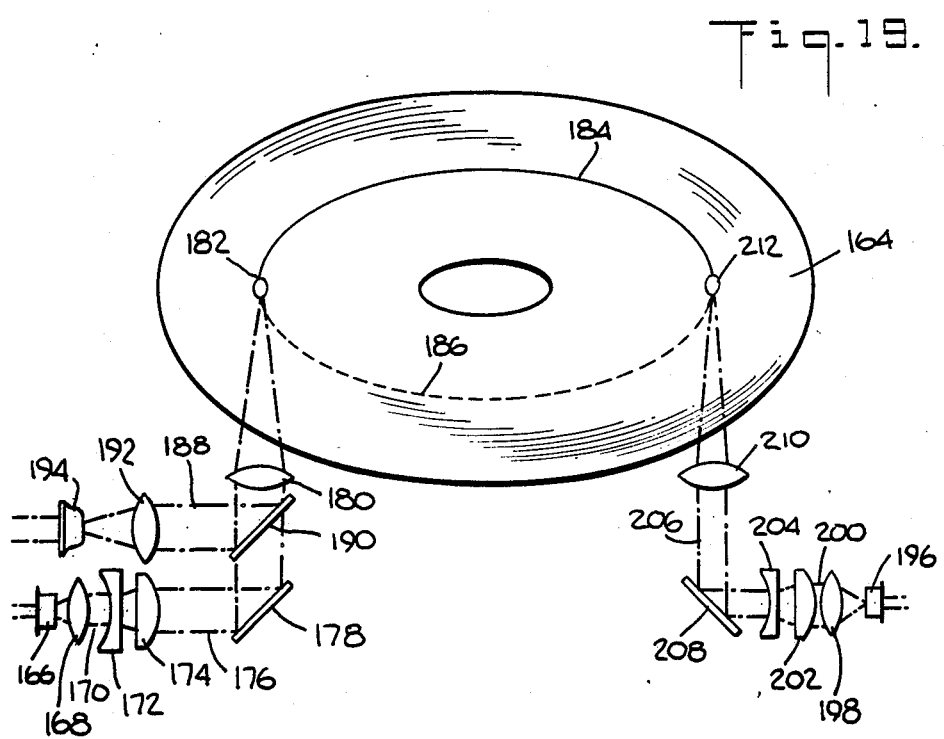
FIG. 19 is a schematic diagram of a recording and reproducing apparatus for recording, reproducing and erasing by using the optical recording medium.

Referring then to FIG. 19, a method of recording and erasing the information on the recording medium of this invention by using two semiconductor lasers differing in the spot length is described below.

EMBODIMENT 11

An optical information recording medium is formed into a disc 164, 200 mm in diameter. The optical system on the left side is for whitening and reproducing. The light emitted from a semiconductor laser 166 for whitening is changed to quasiparallel light 170 by a first lens 168, shaped into a circle by a second lens 172, changed again to parallel light 176 by a third lens 174, reduced to a wavelength of about 0.8 $\mu$m by a fourth lens 180 through a half mirror 178, and focused into a circular spot 182. The irradiation by this circular spot light on the surface of disc 164 rotating at a speed of 1800 rpm provides the same effect as when a pulse light of relatively high power density and relatively short irradiation time is applied. Therefore, if the recording film is preliminarily blackened, a whitening signal 186 may be recorded on a blackened track 184 by laser modulation.

The signal may be detected by a photosensitive diode 194 through a lens 192 which receives a reflected light 188 from the disc 164 through the half mirror 190.

The right side optical system is for blackening. The beam 196 emitted from a laser for blackening is changed to a quasiparallel light 206 by a third lens 204 (a mirror 208 changes the direction of the quasiparallel light 206), and is transformed into a slender oval spot light 212 by a fourth lens 210 which is projected on the disc surface. When the longitudinal direction of this slender spot light is adjusted to match the rotating direction of the disc, the same effect is obtained on the disc surface as when irradiated with a pulse light of relatively weak irradiating power density and relatively long irradiation time. Therefore, the photosensitive layer may be blackened at the same rotating speed as used with a whitening spot light. In this embodiment, a thin film photosensitive layer of [TeO$_x$: Sn] type, which was evaporated on an acrylic resin base having a diameter of 200 nm and a thickness of 1.1 mm, was used as the recording medium. By shaping the laser for blackening to about 8 $\mu m \times 0.8$ $\mu m$ at half value width, recording by whitening and erasing by blackening were attempted at a position of 150 nm diameter by the use of a blackening laser having an output of 11 mW and a power density of 0.8 mW/$\mu m^2$ and by the use of a whitening laser having an output of 8 mW and a power density of 6 mW/$\mu m^2$. A C/N ratio of over 55 dB was obtained at a single frequency of 5 MHz, and the C/N did not deteriorate after recording and erasing was repeated 100,000 times.

EMBODIMENT 12

This example is a method of recording, erasing and reproducing by use of a semiconductor laser. The same disc as in embodiment 11 was used, and the same semiconductor laser and optical system as in embodiment 11 were used here for whitening and reproducing.

The method of recording by whitening on a preblackened disc was the same as that in embodiment 11. In FIG. 19, the light emitted from the semiconductor laser was similarly reduced to a spot of about 0.8 $\mu m$ diameter on a recording plane of the disc which was rotating at 1800 rpm, and the irradiated portion was whitened. The recorded signal was reproduced, as in the case of the previous embodiment, by irradiating with a laser beam with the power lowered to about 0.5 mW/$\mu m^2$.

To erase the whitened signal, i.e., recorded signal, the disc rotating speed was lowered, for instance, to 300 rpm, and a laser beam was applied to the disc at a power density of about 1 mW/$\mu m^2$. As a result, the recorded portion was blackened, that is, erased.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. An optical recording medium comprising a photosensitive layer whose optical density can be reversibly varied between states of high and low optical density when irradiated with light energy, said photosensitive layer including Te, Ge, O and at least one additional element selected from the group consisting of Sb, Bi, In, Tl, Cu, Ag, Au, Pd, and Pt, where the ratio x of the total number of atoms of O to that said Te is in the relation of $0<x<2$ and the mole percentage $Z_1$ of Ge and the mole percentage $Z_2$ of said at least one additional element satisfy the relation of $0<Z_1 \leqq 10$ mol % and $0<Z_2 \leqq 50$ mol % respectively, and where at least part of said Ge and said at least one additional element exist in the layer in non-oxide states.

2. An optical recording medium comprising:

(a) a base made of a material selected from the group consisting of metal, glass, and resin;
(b) a thin film photosensitive layer formed on said base which can be reversibly varied between states of different optical density when irradiated with light energy, and which comprises Te, Ge, O and at least one additional element selected from the group consisting of Sb, Bi, In, Tl, Cu, Ag, Au, Pd, and Pt, where at least part of said oxygen is bonded with said Te to form $TeO_2$, and where the ratio x of the total number of atoms of said oxygen to that of said Te is in a relation $0<x<2$, where the mole percentage $Z_1$ of Ge and the mole percentage $Z_2$ of said at least one additional element satisfy the relation $0<Z_1 \leqq 10$ mol % and $0<Z_2 50$ mol % respectively, and where at least part of said Ge and said at least one additional element exist in said photosensitive layer in non-oxide states; and
(c) a protective layer formed to protect the photosensitive layer.

3. An optical recording medium according to claim 1, wherein said value of $Z_2$ satisfies the relation of $10 \leqq Z_2 \leqq 30$ mol %.

4. An optical recording medium according to claim 2, wherein said value of $Z_2$ satisfies the relation of $10 \leqq Z_2 \leqq 30$ mol %.

5. An optical recording medium according to claim 1, wherein said value of x satisfies the relation $0.1 \leqq x \leqq 1.5$.

6. An optical recording medium according to claim 2, wherein said value of x satisfies the relation $0.1 \leqq x \leqq 1.5$.

7. An optical recording medium according to claim 1, wherein said value of x satisfies the relation $0.2x \leqq 1.2$.

8. An optical recording medium according to claim 2, wherein said value of x satisfies the relation $0.2 \leqq x \leqq 1.2$.

9. An optical recording medium according to claim 1, wherein said at least one additional element is selected from the group consisting of Sb and Bi.

10. An optical recording medium according to claim 2, wherein said at least one additional element is selected from the group consisting of Sb and Bi.

11. An organic recording medium according to claim 1, wherein said at least one additional element is selected from the group consisting of In and Tl.

12. An optical recording medium according to claim 2, wherein said at least one additional element is selected from the group consisting of In and Tl.

13. An optical recording medium according to claim 1, wherein said at least one additional element is selected from the group consisting of Cu, Ag and Au.

14. An optical recording medium according to claim 2, wherein said at least one additional element is selected from the group consisting of Cu, Ag and Au.

15. An optical recording medium according to claim 1, wherein said at least one additional element is selected from the group consisting of Pd and Pt.

16. An optical recording medium according to claim 2, wherein said at least one additional element is selected from the group consisting of Pd and Pt.

* * * * *

UNITED STATES PATENT AND TRADEMARK OFFICE
CERTIFICATE OF CORRECTION

PATENT NO.   : 4,916,048

DATED        : April 10, 1990

INVENTOR(S)  : Yamada et al.

It is certified that error appears in the above—identified patent and that said Letters Patent is hereby corrected as shown below:

In the drawings, Sheet 8, Fig. 14, the caption "LASER POWER 0.8mW/$\mu m^2$" should read -- LASER POWER 6mW/$\mu m^2$ --.

Signed and Sealed this

Eighth Day of September, 1992

Attest:

DOUGLAS B. COMER

Attesting Officer

Acting Commissioner of Patents and Trademarks